United States Patent
Aiba et al.

(10) Patent No.: US 10,470,208 B2
(45) Date of Patent: Nov. 5, 2019

(54) TERMINAL APPARATUS, BASE STATION APPARATUS, COMMUNICATION METHOD, AND INTEGRATED CIRCUIT

(71) Applicant: Sharp Kabushiki Kaisha, Osaka-shi, Osaka (JP)

(72) Inventors: Tatsushi Aiba, Osaka (JP); Shoichi Suzuki, Osaka (JP); Kazunari Yokomakura, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 115 days.

(21) Appl. No.: 14/912,678

(22) PCT Filed: Aug. 22, 2014

(86) PCT No.: PCT/JP2014/071996
§ 371 (c)(1),
(2) Date: Feb. 18, 2016

(87) PCT Pub. No.: WO2015/025953
PCT Pub. Date: Feb. 26, 2015

(65) Prior Publication Data
US 2016/0205704 A1   Jul. 14, 2016

(30) Foreign Application Priority Data

Aug. 23, 2013   (JP) .................................. 2013-172793
Aug. 30, 2013   (JP) .................................. 2013-179068

(51) Int. Cl.
H04W 72/14   (2009.01)
H04W 72/04   (2009.01)
(Continued)

(52) U.S. Cl.
CPC ........... *H04W 72/14* (2013.01); *H04L 5/0044* (2013.01); *H04W 72/04* (2013.01); *H04L 5/0078* (2013.01);
(Continued)

(58) Field of Classification Search
None
See application file for complete search history.

(56) References Cited

U.S. PATENT DOCUMENTS

2013/0016686 A1*   1/2013   Li .......................... H04L 1/1822
                                                                370/329
2013/0142140 A1*   6/2013   Tseng .................. H04W 72/042
                                                                370/329
(Continued)

OTHER PUBLICATIONS

Ericsson et al., "On standardization impact of TDD UL-DL adaptation", 3GPP TSG-RAN WG1 #69, R1-122016, May 21-25, 2012, pp. 1-3.
(Continued)

*Primary Examiner* — Chi H Pham
*Assistant Examiner* — Vladislav Y Agureyev
(74) *Attorney, Agent, or Firm* — Keating & Bennett, LLP

(57) ABSTRACT

A terminal apparatus including a reception unit that receives first information indicating a first uplink-downlink configuration and receives second information indicating a second uplink-downlink configuration and a transmission unit that performs transmission on a physical uplink shared channel based on an uplink grant only in a subframe indicated as an uplink subframe by the second information, in which in a case where an uplink grant related to semi-persistent scheduling is considered to occur in a subframe specified based on at least a value of an offset and when two-intervals-Semi-Persistent Scheduling for an uplink is validated, the value of the offset is set based on the first uplink-downlink configuration, and when the two-intervals-semi-persistent schedul-
(Continued)

ing for the uplink is not validated, the value of the offset is set to 0. Accordingly, the terminal apparatus can perform transmission of uplink data efficiently.

4 Claims, 19 Drawing Sheets

(51) Int. Cl.
*H04L 5/00* (2006.01)
*H04L 5/14* (2006.01)
*H04W 28/18* (2009.01)
*H04W 72/12* (2009.01)

(52) U.S. Cl.
CPC .......... *H04L 5/0092* (2013.01); *H04L 5/1469* (2013.01); *H04W 28/18* (2013.01); *H04W 72/042* (2013.01); *H04W 72/0446* (2013.01); *H04W 72/12* (2013.01)

(56) References Cited

U.S. PATENT DOCUMENTS

| | | | | |
|---|---|---|---|---|
| 2013/0182627 A1* | 7/2013 | Lee | ............... | H04W 72/042 370/311 |
| 2013/0260821 A1* | 10/2013 | Deparis | ............... | H04W 88/06 455/553.1 |
| 2014/0023008 A1* | 1/2014 | Ahn | ............... | H04L 5/006 370/329 |
| 2014/0036843 A1* | 2/2014 | Mohanty | ............... | H04W 72/0406 370/329 |
| 2014/0036889 A1* | 2/2014 | Kim | ............... | H04L 1/1854 370/336 |
| 2014/0056184 A1* | 2/2014 | Yang | ............... | H04L 5/001 370/280 |
| 2014/0086112 A1* | 3/2014 | Stern-Berkowitz | ............... | H04W 72/1289 370/280 |
| 2014/0112289 A1* | 4/2014 | Kim | ............... | H04W 16/14 370/329 |
| 2014/0269452 A1* | 9/2014 | Papasakellariou | ... | H04B 7/2643 370/280 |
| 2014/0269475 A1* | 9/2014 | Ehsan | ............... | H04W 52/0235 370/311 |
| 2014/0307696 A1* | 10/2014 | Choi | ............... | H04L 1/0038 370/329 |
| 2015/0049694 A1* | 2/2015 | Choi | ............... | H04L 5/0032 370/329 |
| 2015/0271798 A1* | 9/2015 | Chen | ............... | H04L 1/1812 370/329 |
| 2016/0205683 A1* | 7/2016 | Quan | ............... | H04W 16/10 370/280 |

OTHER PUBLICATIONS

Ericsson et al., "Signalling support for dynamic TDD", 3GPP TSG-RAN WG1 #72, R1-130558, Jan. 28-Feb. 1, 2013, 3 pages.

* cited by examiner

FIG. 7

| UL-DL CONFIGURATION | DOWNLINK-TO-UPLINK SWITCH-POINT PERIODICITY | SUBFRAME NUMBERS | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 10

| SET # | (PRIMARY CELL UL-DL CONFIGURATION, SECONDARY CELL UL-DL CONFIGURATION) | SECONDARY CELL SECOND UL REFERENCE UL-DL CONFIGURATION |
|---|---|---|
| SET 1 | (1,1),(1,2),(1,4),(1,5) | 1 |
| | (2,2),(2,5) | 2 |
| | (3,3),(3,4),(3,5) | 3 |
| | (4,4),(4,5) | 4 |
| | (5,5) | 5 |
| SET 2 | (1,0),(2,0),(3,0),(4,0),(5,0),(6,0) | 0 |
| | (2,1),(4,1),(5,1) | 1 |
| | (5,2) | 2 |
| | (4,3),(5,3) | 3 |
| | (5,4) | 4 |
| SET 3 | (1,6),(2,6),(3,6),(4,6),(5,6) | 6 |
| | (3,1) | 1 |
| | (3,2),(4,2) | 2 |
| | (1,3),(2,3) | 3 |
| | (2,4) | 4 |
| SET 4 | (0,0),(6,0) | 0 |
| | (0,1),(0,2),(0,4),(0,5),(6,1),(6,2),(6,5) | 1 |
| | (0,3),(0,6) | 3 |
| | (6,4) | 4 |
| | (0,6),(6,6) | 6 |

FIG. 12

| SET # | (PRIMARY CELL UL-DL CONFIGURATION, SECONDARY CELL UL-DL CONFIGURATION) | SECONDARY CELL SECOND DOWNLINK REFERENCE UL-DL CONFIGURATION |
|---|---|---|
| SET 1 | (0,0) | 0 |
| | (1,0),(1,1),(1,6) | 1 |
| | (2,0),(2,2),(2,1),(2,6) | 2 |
| | (3,0),(3,3),(3,6) | 3 |
| | (4,0),(4,1),(4,3),(4,4),(4,6) | 4 |
| | (5,0),(5,1),(5,2),(5,3),(5,4),(5,5),(5,6) | 5 |
| | (6,0),(6,6) | 6 |
| SET 2 | (0,1),(6,1) | 1 |
| | (0,2),(1,2),(6,2) | 2 |
| | (0,3),(6,3) | 3 |
| | (0,4),(1,4),(3,4),(6,4) | 4 |
| | (0,5),(1,5),(2,5),(3,5),(4,5),(6,5) | 5 |
| | (0,6) | 6 |
| SET 3 | (3,1),(1,3) | 4 |
| | (3,2),(4,2),(2,3),(2,4) | 5 |
| SET 4 | (0,1),(02),(0,3),(0,4),(0,5),(0,6) | 0 |
| | (1,2),(1,4),(1,5) | 1 |
| | (2,5) | 2 |
| | (3,4),(3,5) | 3 |
| | (4,5) | 4 |
| | (6,1),(6,2),(6,3),(6,4),(6,5) | 6 |
| SET 5 | (1,3) | 1 |
| | (2,3),(2,4) | 2 |
| | (3,1),(3,2) | 3 |
| | (4,2) | 4 |

FIG. 13

| UL-DL CONFIGURATION | SUBFRAME NUMBERS | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 14

| UL-DL CONFIGURATION | SUBFRAME NUMBERS | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 15

| UL-DL CONFIGURATION | SUBFRAME NUMBERS | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | 6 | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

FIG. 16

| UL-DL CONFIGURATION | POSITION OF INITIAL SPS UL grant | VALUE OF Subframe_Offset (ms) |
|---|---|---|
| 0 | – | 0 |
| 1 | SUBFRAME 2 | 1 |
| 1 | SUBFRAME 3 | -1 |
| 1 | SUBFRAME 7 | 1 |
| 1 | SUBFRAME 8 | -1 |
| 2 | SUBFRAME 2 | 5 |
| 2 | SUBFRAME 7 | -5 |
| 3 | SUBFRAME 2 | 1 |
| 3 | SUBFRAME 3 | 1 |
| 3 | SUBFRAME 4 | -2 |
| 4 | SUBFRAME 2 | 1 |
| 4 | SUBFRAME 3 | -1 |
| 5 | – | 0 |
| 6 | – | 0 |

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

Priority is claimed on Japanese Patent Application No. 2013-172793, filed Aug. 23, 2013 and Japanese Patent Application No. 2013-179068, filed Aug. 30, 2013, the content of which is incorporated herein by reference.

BACKGROUND ART

Radio access schemes and radio networks (hereinafter referred to as a long term evolution (LTE) or an evolved universal terrestrial radio access (EUTRA)) of cellular mobile communication have been examined in the 3rd Generation Partnership Project (3GPP). In the LTE, a base station apparatus is referred to as an eNodeB (evolved NodeB) and a terminal apparatus is referred to as UE (user equipment). The LTE is a cellular communication system in which a plurality of areas covered by base station apparatuses are arranged in cell forms. A single base station apparatus may manage a plurality of cells.

The LTE may correspond to time division duplex (TDD). The LTE adopting a TDD scheme is referred to as a TD-LTE or LTE TDD. In the TDD, uplink and downlink signals are subjected to time division multiplexing.

The 3GPP have examined that traffic adaptation technologies and interference management and traffic adaptation technologies (DL-UL Interference Management and Traffic Adaptation) are applied to the TD-LTE. A traffic adaption technology is a technology for changing a ratio between an uplink resource and a downlink resource according to an uplink traffic and a downlink traffic. The traffic adaptation technology is also referred to as a dynamic TDD.

In NPL 1, a method of using a flexible subframe is suggested as a method of realizing traffic adaptation. A base station apparatus can receive an uplink signal or transmit a downlink signal in a flexible subframe. In NPL 1, a terminal apparatus regards a flexible subframe as a downlink subframe unless the terminal apparatus receives an indication to transmit an uplink signal in the flexible subframe from the base station apparatus.

NPL 1 discloses that an HARQ (hybrid automatic repeat request) timing with respect to a PDSCH (physical downlink shared channel) is determined based on newly introduced UL-DL configuration (uplink-downlink configuration) and an HARQ timing with respect to a PUSCH (physical uplink shared channel) is determined based on initial UL-DL configuration.

NPL 2 discloses that (a) UL/DL reference configuration is introduced and (b) some subframes can be scheduled for either of an uplink and a downlink via dynamic grant/assignment from a scheduler.

CITATION LIST

Non Patent Literature

NPL 1: "On standardization impact of TDD UL-DL adaptation", R1-122016, Ericsson, ST-Ericsson, 3GPP TSG-RAN WG1 Meeting #69, Prague, Czech Republic, 21st to 25 May 2012

NPL 2: "Signaling support for dynamic TDD", R1-130558, Ericsson, ST-Ericsson, 3GPP TSG-RAN WG1 Meeting #72, St Julian's, Malta, 28th January to 1st February 2013

DISCLOSURE OF INVENTION

Problems to be Solved by the Invention

In the above-described radio communication systems, however, a specific procedure when a terminal apparatus transmits uplink data is not described. For example, a specific procedure when a terminal apparatus transmits uplink data based on semi-persistent scheduling is not described.

An aspect of the present invention is devised to the foregoing circumstance and an object of the present invention is to provide a terminal apparatus, a base station apparatus, a communication method, and an integrated circuit in which the terminal apparatus can efficiently transmit uplink data.

Means for Solving the Problems (1) To achieve the foregoing object, an aspect of the present invention has contrived the following means. That is, according to an aspect of the invention, there is provided a terminal apparatus that includes: a reception unit that receives first information indicating a first uplink-downlink configuration using system information block type 1 and receives second information indicating a second uplink-downlink configuration using a physical downlink control channel; and a transmission unit that performs transmission on a physical uplink shared channel based on an uplink grant only in a subframe indicated as an uplink subframe by the second information, in which in a case where an uplink grant related to semi-persistent scheduling is considered to occur in a subframe specified based on at least a value of an offset and when two-intervals-Semi-Persistent Scheduling for an uplink is validated, the value of the offset is set based on the first uplink-downlink configuration, and when the two-intervals-Semi-Persistent Scheduling for the uplink is not validated, the value of the offset is set to 0.

(2) In the terminal apparatus according to an aspect of the invention, the reception unit may receive the first information using an RRC message dedicated for the terminal apparatus.

(3) According to an aspect of the invention, there is provided a base station apparatus that communicates with a terminal apparatus and that includes: a transmission unit that transmits first information indicating a first uplink-downlink configuration using system information block type 1 and transmits second information indicating a second uplink-downlink configuration using a physical downlink control channel; and a reception unit that performs reception on a physical uplink shared channel based on an uplink grant only in a subframe indicated as an uplink subframe by the second information in which in a case where an uplink grant related to semi-persistent scheduling is considered to occur in a subframe specified based on at least a value of an offset and when two-intervals-Semi-Persistent Scheduling for an uplink is validated, the value of the offset is set based on the first uplink-downlink configuration, and when the two-intervals-Semi-Persistent Scheduling for the uplink is not validated, the value of the offset is set to 0.

(4) In the base station apparatus according to an aspect of the invention, the transmission unit may transmit the first information using an RRC message dedicated for the terminal apparatus.

(5) According to an aspect of the invention, there is provided a communication method of a terminal apparatus that communicates with a base station apparatus, the method including: receiving first information indicating a first uplink-downlink configuration using system information block type 1; receiving second information indicating a second uplink-downlink configuration using a physical downlink control channel; and performing transmission on a physical uplink shared channel based on an uplink grant only in a subframe indicated as an uplink subframe by the second information, in which in a case where an uplink grant related to semi-persistent scheduling is considered to occur in a subframe specified based on at least a value of an offset and when two-intervals-Semi-Persistent Scheduling for an uplink is validated, the value of the offset is set based on the first uplink-downlink configuration, and when the two-intervals-Semi-Persistent Scheduling for the uplink is not validated, the value of the offset is set to 0.

(6) According to an aspect of the invention, there is provided a communication method of a base station apparatus that communicates with a terminal apparatus, the method including: transmitting first information indicating a first uplink-downlink configuration using system information block type 1; transmitting second information indicating a second uplink-downlink configuration using a physical downlink control channel; and performing reception on a physical uplink shared channel based on an uplink grant only in a subframe indicated as an uplink subframe by the second information, in which in a case where an uplink grant related to semi-persistent scheduling is considered to occur in a subframe specified based on at least a value of an offset and when two-intervals-Semi-Persistent Scheduling for an uplink is validated, the value of the offset is set based on the first uplink-downlink configuration, and when the two-intervals-Semi-Persistent Scheduling for the uplink is not validated, the value of the offset is set to 0.

(7) According to an aspect of the invention, there is provided an integrated circuit mounted on a terminal apparatus that communicates with a base station apparatus, the integrated circuit causing the terminal apparatus to have: a function of receiving first information indicating a first uplink-downlink configuration using system information block type 1 and receiving second information indicating a second uplink-downlink configuration using a physical downlink control channel; and a function of performing transmission on a physical uplink shared channel based on an uplink grant only in a subframe indicated as an uplink subframe by the second information, in which in a case where an uplink grant related to semi-persistent scheduling is considered to occur in a subframe specified based on at least a value of an offset and when two-intervals-Semi-Persistent Scheduling for an uplink is validated, the value of the offset is set based on the first uplink-downlink configuration, and when the two-intervals-Semi-Persistent Scheduling for the uplink is not validated, the value of the offset is set to 0.

Effects of the Invention

According to an aspect of the present invention, the terminal apparatus can efficiently transmit uplink data.

BRIEF DESCRIPTION OF THE DRAWINGS

FIG. 7 is a table illustrating an example of uplink-downlink (UL-DL) configuration.

FIG. 10 is a diagram illustrating a pair formed by the first UL reference UL-DL configuration for another serving cell (primary cell) and the first UL reference UL-DL configuration for a serving cell (secondary cell) and correspondence to the second UL reference UL-DL configuration for the secondary cell.

FIG. 12 is a diagram illustrating a pair formed by the first DL reference UL-DL configuration for the primary cell and the first DL reference UL-DL configuration for the secondary cell and correspondence to the second DL reference UL-DL configuration for the secondary cell.

FIG. 13 is a diagram illustrating correspondence between subframe n in which PDCCH/EPDCCH/PHICH are arranged and subframe n+k in which PUSCHs corresponding to the PDCCH/EPDCCH/PHICH are arranged.

FIG. 14 is a diagram illustrating correspondence between subframe n in which PUSCH is arranged and subframe n+k in which PHICH corresponding to the PUSCH is arranged.

FIG. 15 is a diagram illustrating correspondence between subframe n−k in which PDSCH is arranged and subframe n in which HARQ-ACK corresponding to the PDSCH is transmitted.

FIG. 16 is a diagram illustrating examples of values of subframe offsets.

BEST MODE FOR CARRYING OUT THE INVENTION

Hereinafter, an embodiment of the present invention will be described.

In the embodiment, terminal apparatuses may be configured in a plurality of cells. A technology for enabling a terminal apparatus to perform communication via a plurality of cells is referred to as cell aggregation or carrier aggregation. Here, the embodiment may also be applied to each of the plurality of cells configured in the terminal apparatuses. The present invention may also be applied to some of the plurality of configured cells configured in the terminal apparatuses. Here, a cell configured in a terminal apparatus is also referred to as a serving cell.

The plurality of configured serving cells include one primary cell and one or a plurality of secondary cells. The primary cell is a serving cell in which an initial connection establishment procedure is performed, a serving cell in which a connection re-establishment procedure starts, or a cell which is indicated as a primary cell in a handover procedure. When or after RRC connection is established, the secondary cells may be configured.

At least a TDD (time division duplex) scheme is applied to a radio communication system according to the embodiment. In the case of the cell aggregation, for example, the TDD scheme may be applied to all of the plurality of cells. In the case of the cell aggregation, cells to which the TDD scheme is applied and cells to which an FDD (frequency division duplex) scheme is applied may be aggregated. That is, in the case of the cell aggregation, the embodiment can be applied to some cells.

Figure 1:
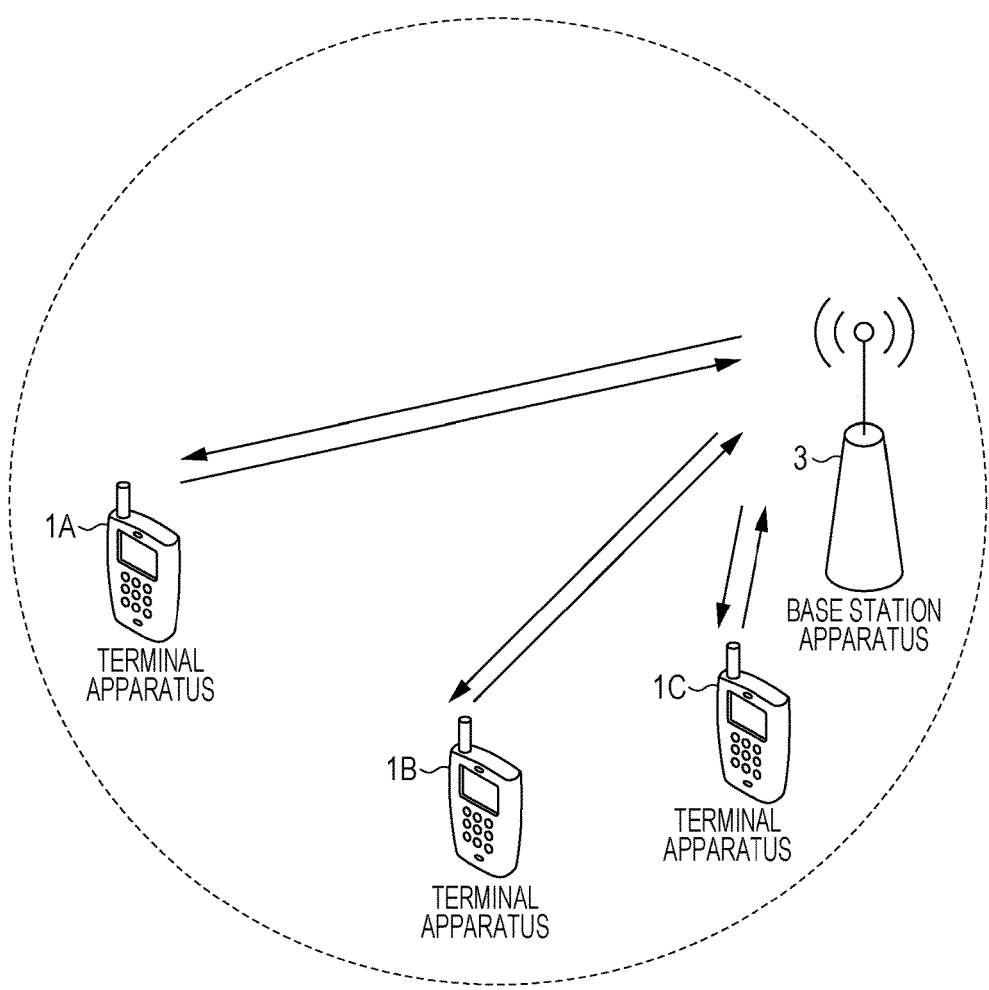
FIG. 1 is a conceptual diagram illustrating a radio communication system according to an embodiment.

FIG. 1 is a conceptual diagram illustrating a radio communication system according to the embodiment. In FIG. 1, the radio communication system according to the embodiment includes terminal apparatuses 1A to 1C and a base station apparatus 3. Hereinafter, the terminal apparatuses 1A to 1C are also referred to as the terminal apparatuses 1.

Physical channels and physical signals according to the embodiment will be described.

In FIG. 1, the following uplink physical channels are used in uplink radio communication from the terminal apparatus 1 to the base station apparatus 3. The uplink physical channels are used to transmit information output from higher layers.

PUCCH (Physical Uplink Control Channel)
PUSCH (Physical Uplink Shared Channel)
PRACH (Physical Random Access Channel)

The PUCCH is a physical channel that is used to transmit uplink control information (UCI). The uplink control information includes channel state information (CSI) of a downlink, a scheduling request (SR) indicating a request for a PUSCH resource, and ACK (acknowledgement)/NACK (negative acknowledgement) to downlink data (Transport block, Downlink-Shared Channel: DL-SCH). Here, the ACK/NACK is referred to as HARQ-ACK, HARQ feedback, or acknowledgement information.

The PUSCH is used to transmit uplink data (Transport block, Uplink-Shared Channel: UL-SCH). That is, the transmission of the uplink data on the UL-SCH is performed via the PUSCH. That is, the UL-SCH which is a transport channel is mapped to the PUSCH which is a physical channel. The PUSCH may also be used to transmit HARQ-ACK and/or channel state information along with the uplink data. The PUSCH may be used to transmit only the channel state information or only the HARQ-ACK and the channel state information.

The PUSCH is used to transmit an RRC message. The RRC message is information/signal that is processed in a radio resource control (RRC) layer. The PUSCH is used to transmit a MAC CE (control element). Here, the MAC CE is information/signal that is processed (transmitted) in the medium access control (MAC) layer.

The PRACH is used to transmit a random access preamble. Further, the PRACH is also used to indicate an initial connection establishment procedure, a handover procedure, a connection re-establishment procedure, synchronization (timing adjustment) for uplink transmission, and a request for PUSCH resources.

In FIG. 1, the following uplink physical signal is used in the uplink radio communication. The uplink physical signal is not used to transmit information output from a higher layer, but is used in the physical layer.

Uplink Reference Signal (UL RS)

In the embodiment, the following two types of uplink reference signals are used.

DMRS (Demodulation Reference Signal)
SRS (Sounding Reference Signal)

The DMRS is related to transmission of the PUSCH or the PUCCH. The DMRS is subjected to time-domain multiplexing with the PUSCH or the PUCCH. For example, the base station apparatus 3 uses the DMRS to perform channel correction of the PUSCH or the PUCCH.

The SRS is not related to the transmission of the PUSCH or the PUCCH. The base station apparatus 3 uses the SRS to measure an uplink channel state. The terminal apparatus 1 transmits a first SRS in a first resource set in a higher layer. Further, the terminal apparatus 1 transmits a second SRS in a second resource set in a higher layer only once when the terminal apparatus 1 receives information indicating a request to transmit the SRS via the PDCCH. Here, the first SRS is also referred to as a periodic SRS or a type 0 triggered SRS. The second SRS is also referred to as an aperiodic SRS or a type 1 triggered SRS.

In FIG. 1, the following downlink physical channels are used in downlink radio communication from the base station apparatus 3 to the terminal apparatus 1. The downlink physical channels are used to transmit information output from higher layers.

PBCH (Physical Broadcast Channel)
PCFICH (Physical Control Format Indicator Channel)
PHICH (Physical Hybrid automatic repeat request Indictor Channel)
PDCCH (Physical Downlink Control Channel)
EPDCCH (Enhanced Physical Downlink Control Channel)
PDSCH (Physical Downlink Shared Channel)
PMCH (Physical Multicast Channel)

The PBCH is used to report a master information block (MIB, broadcast channel: BCH) used commonly in the terminal apparatuses 1. For example, the MIB is transmitted at intervals of 40 ms. The MIB is repeatedly transmitted at a period of 10 ms. The MIB includes information indicating SFN (system frame number). Here, the SFN indicates a radio frame number. The MIB is system information.

The PCFICH is used to transmit information indicating a domain (OFDM symbol) used to transmit the PDCCH.

The PHICH is used to transmit an HARQ indicator (HARQ feedback, acknowledgement information) indicating ACK (ACKnowledgement) or NACK (Negative ACKnowledgement) to uplink data (Uplink shared Channel: UL-SCH) received by the base station apparatus 3.

The PDCCH and the EPDCCH are used to transmit downlink control information (DCI). Here, a plurality of DCI formats are defined in transmission of downlink control information. That is, a field for the downlink control information is defined with the DCI format and is mapped to an information bit.

For example, DCI format 1A used to schedule one PDSCH (transmission of one downlink transport block) in one cell is defined as the DCI format for a downlink.

For example, the DCI format for a downlink includes information regarding the scheduling of the PDSCH. For example, the DCI format for a downlink includes downlink control information such as information regarding resource block assignment, information regarding an MCS (modulation and coding scheme), and information regarding a TPC command for the PUCCH. Here, the DCI format for a downlink is also referred to as a downlink grant (or downlink assignment).

For example, DCI format 0 used to schedule one PUSCH (transmission of one uplink transport block) in one cell is defined as the DCI format for an uplink.

For example, the DCI format for an uplink includes information regarding scheduling of the PUSCH. For example, the DCI format for an uplink includes information regarding resource block assignment and/or hopping resource allocation, information modulation and coding scheme (MCS) and/or redundancy version, information regarding a TPC command, information regarding cyclic shift, and information regarding a new data indicator. Here, the DCI format for an uplink is also referred to as uplink grant (or uplink assignment).

When the resource of the PDSCH is scheduled using the downlink assignment, the terminal apparatus 1 receives downlink data on the scheduled PDSCH. When the resource of the PUSCH is scheduled using the uplink grant, the terminal apparatus 1 transmits uplink data and/or uplink control information on the scheduled PUSCH.

The terminal apparatus 1 monitors a PDCCH candidate and/or EPDCCH candidate set. Hereinafter, the EPDCCH is included in the PDCCH to facilitate the description. The PDCCH candidates refer to candidates for which there is a possibility of the PDCCH being mapped and transmitted by the base station apparatus 3. The monitoring may include a meaning that the terminal apparatus 1 tries to decode each PDCCH in the PDCCH candidate set according to all the DCI formats to be monitored.

Here, the PDCCH candidate set monitored by the terminal apparatus 1 is also referred to as a search space. The search space includes a common search space (CSS) and a user equipment (UE)-specific search space (USS). The CSS is a region in which the plurality of terminal apparatuses 1 commonly monitor the PDCCH/EPDCCH. The USS is a region which is defined based on at least a C-RNTI. The terminal apparatus 1 monitors the PDCCH in the CSS and/or the USS and detects the PDCCH destined for the terminal apparatus.

An RNTI assigned to the terminal apparatus 1 by the base station apparatus 3 is used to transmit the downlink control information (transmission on the PDCCH). Specifically, CRC (cyclic redundancy check) parity bits are attached to the DCI format (which may be the downlink control information) and the CRC parity bits are scrambled by the RNTI after the attachment. Here, the CRC parity bits attached to the DCI format may be obtained from a payload of the DCI format.

The terminal apparatus 1 attempts to decode the DCI format to which the CRC parity bits scrambled by the RNTI is attached and detects the DCI format for which the CRC is successful as the DCI format destined for the terminal apparatus (which is also referred to as blind decoding).

Here, the RNTI includes a C-RNTI (cell-radio network temporary identifier). The C-RNTI is a unique identifier used to identify RRC connection and scheduling.

The C-RNTI is used for dynamically scheduled unicast transmission.

The RNTI includes an SPS C-RNTI (semi-persistent scheduling C-RNTI). The SPS C-RNTI is a unique identifier used for semi-persistent scheduling. The SPS C-RNTI is used for semi-persistently scheduled unicast transmission.

Here, the semi-persistently scheduled unicast transmission includes a meaning of periodically scheduled transmission. For example, the SPS C-RNTI is used for activation, reactivation, and/or retransmission of the semi-persistently scheduled transmission. The SPS C-RNTI is used for release and/or deactivation of the semi-persistently scheduled transmission.

The PDSCH is used to transmit downlink data (downlink transport block, DL-SCH). The PDSCH is used to transmit a system information block type 1 message. The system information block type 1 message is cell-specific information.

The PDSCH is used to transmit a system information message. The system information message may include a system information block X other than system information block type 1. The system information message is cell-specific information.

The PDSCH is used to transmit an RRC message. Here, the RRC message transmitted from the base station apparatus 3 may be common in the plurality of terminal apparatuses 1 in a cell. The RRC message transmitted from the base station apparatus 3 may be a dedicated message (which is also referred to as a dedicated signaling) to the certain terminal apparatus 1. That is, the information specific to a user apparatus is transmitted using the dedicated message to the certain terminal apparatus 1. The PDSCH is used to transmit the MAC CE.

Here, the RRC message and/or the MAC CE are also referred to as a higher layer signaling.

The PMCH is used to transmit multicast data (Multicast Channel: MCH).

In FIG. 1, the following downlink physical signals are used in downlink radio communication. The downlink physical signals are not used to transmit information output from higher layers, but are used in the physical layer.
Synchronization Signal (SS)
Downlink Reference Signal (DL RS)

The synchronization signal is used for the terminal apparatus 1 to take synchronization of a frequency region and a time region of a downlink. In the TDD scheme, for example, synchronization signals are arranged in subframes 0, 1, 5, and 6 of a radio frame. In the FDD scheme, synchronization signals are arranged in subframes 0 and 5 of a radio frame.

The downlink reference signal is used for the terminal apparatus 1 to correct a channel of a downlink physical channel. The downlink reference signal is used for the terminal apparatus 1 to calculate downlink channel state information.

In the embodiment, the following five types of downlink reference signals are used.
CRS (Cell-specific Reference Signal)
URS (UE-specific Reference Signal) associated with PDSCH
DMRS (Demodulation Reference Signal) associated with EPDCCH
NZP CSI-RS (Non-Zero Power Channel State Information-Reference Signal)
ZP CSI-RS (Zero Power Channel State Information-Reference Signal)
MBSFN RS (Multimedia Broadcast and Multicast Service over Signal Frequency Network Reference signal)
PRS (Positioning Reference Signal)

The CRS is transmitted in the entire band of a subframe. The CRS is used to demodulate the PBCH/PDCCH/PHICH/PCFICH/PDSCH. The CRS may be used for the terminal apparatus 1 to calculate the downlink channel state information. The PBCH/PDCCH/PHICH/PCFICH is transmitted on an antenna port used for transmission of the CRS.

The URS associated with the PDSCH is transmitted in a subframe and a band used for transmission of the PDSCH with which the URS is associated. The URS is used to demodulate the PDSCH with which the URS is associated.

The PDSCH is transmitted with an antenna port used for transmission of the CRS the URS. A DCI format 1A is used for scheduling of the PDSCH transmitted with the antenna port used for transmission of the CRS. A DCI format 2D is used for scheduling of the PDSCH transmitted with the antenna port used for transmission of the URS.

The DMRS associated with the EPDCCH is transmitted in a subframe and a bandwidth used for transmission of the EPDCCH with which the DMRS is associated. The DMRS is used to demodulate the EPDCCH with which the DMRS is associated. The EPDCCH is transmitted with an antenna port used for transmission of the DMRS.

The NZP CSI-RS is transmitted with a configured subframe. A resource transmitted by the NZP CSI-RS is configured by the base station apparatus. The NZP CSI-RS is used for the terminal apparatus 1 to calculate the downlink channel state information. The terminal apparatus 1 performs signal measurement (channel measurement) using the NZP CSI-RS.

The resource of the ZP CSI-RS is configured by the base station apparatus 3. The base station apparatus 3 transmits the ZP CSI-RS with a zero output power. That is, the base station apparatus 3 does not transmit the ZP CSI-RS. The base station apparatus 3 does not transmit the PDSCH and the EPDCCH in the configured resource of the ZP CSI-RS. For example, in a resource to which the NZP CSI-RS corresponds in a certain cell, the terminal apparatus 1 can measure interference.

The MBSFN RS is transmitted in the entire bandwidth of a subframe used for transmission of the PMCH. The MBSFN RS is used to demodulate the PMCH. The PMCH is transmitted on an antenna port used for transmission of the MBSFN RS.

The PRS is used for the terminal apparatus to measure a geographic location of the terminal apparatus.

The downlink physical channels and the downlink physical signals are collectively referred to as downlink signals. The uplink physical channels and the uplink physical signals are collectively referred to as uplink signals. The downlink physical channels and the uplink physical channels are collectively referred to as physical channels. The downlink physical signals and the uplink physical signals are collectively referred to as physical signals.

The BCH, MCH, UL-SCH, and DL-SCH are transport channels. A channel used in the Medium Access Control (MAC) layer is referred to as a transport channel. Units of transport channels used in the MAC layer are referred to as a transport block (TB) or a MAC PDU (protocol data unit). In the MAC layer, control of HARQ (Hybrid Automatic Repeat reQuest) is performed for each transport block. The transport block is units of data delivered from the MAC layer to the physical layer. In the physical layer, the transport block is mapped to a code word and a coding process is performed for each code word.

Hereinafter, the structure of a radio frame will be described.

Figure 2:
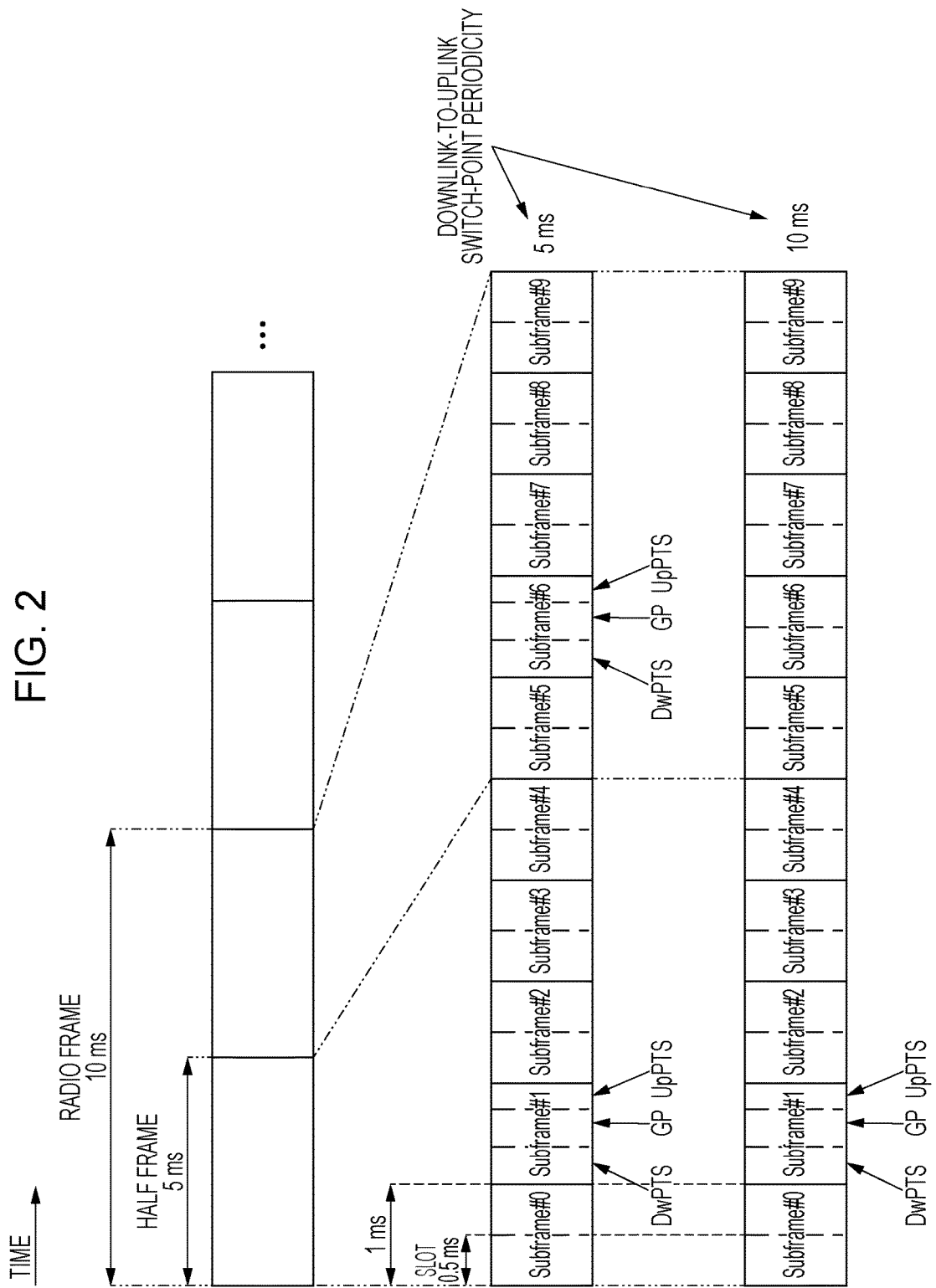
FIG. 2 is a diagram illustrating the structure of a radio frame.

FIG. 2 is a diagram illustrating an overall structure of a radio frame according to the embodiment. In FIG. 2, the horizontal axis is a time axis. For example, each of the radio frames has a length of 10 ms. Each of the radio frames is configured to include two half frames. Each of the half frames has a length of 5 ms. Each of the half frames is configured to include five subframes. Each of the subframes has a length of 1 ms and is defined by two contiguous slots. Each of the slots has a length of 0.5 ms. An i-th subframe in the radio frame includes a (2×i)-th slot and a (2×i+1)-th slot. That is, ten subframes can be used at intervals of 10 ms. Here, the subframe is also referred to as a transmission time interval (TTI).

In the embodiment, the following three types of subframes are defined.
Downlink Subframe (first subframe)
Uplink Subframe (second subframe)
Special Subframe (third subframe)

The downlink subframe is a subframe reserved for downlink transmission. The uplink subframe is a subframe reserved for uplink transmission.

The special subframe includes three fields. The three fields are a DwPTS (Downlink Pilot Time Slot), a GP (Guard Period), and an UpPTS (Uplink Pilot Time Slot). A total length of the DwPTS, the GP, and the UpPTS is 1 ms. The DwPTS is a field reserved for downlink transmission. The UpPTS is a field reserved for uplink transmission. The GP is a field for which the downlink transmission and the uplink transmission are not performed. The special subframe may include only the DwPTS and the GP or may include only the GP and the UpPTS.

That is, a single radio frame includes at least a downlink subframe, an uplink subframe, and a special subframe.

Hereinafter, the structure of a slot according to the embodiment will be described.

Figure 3:
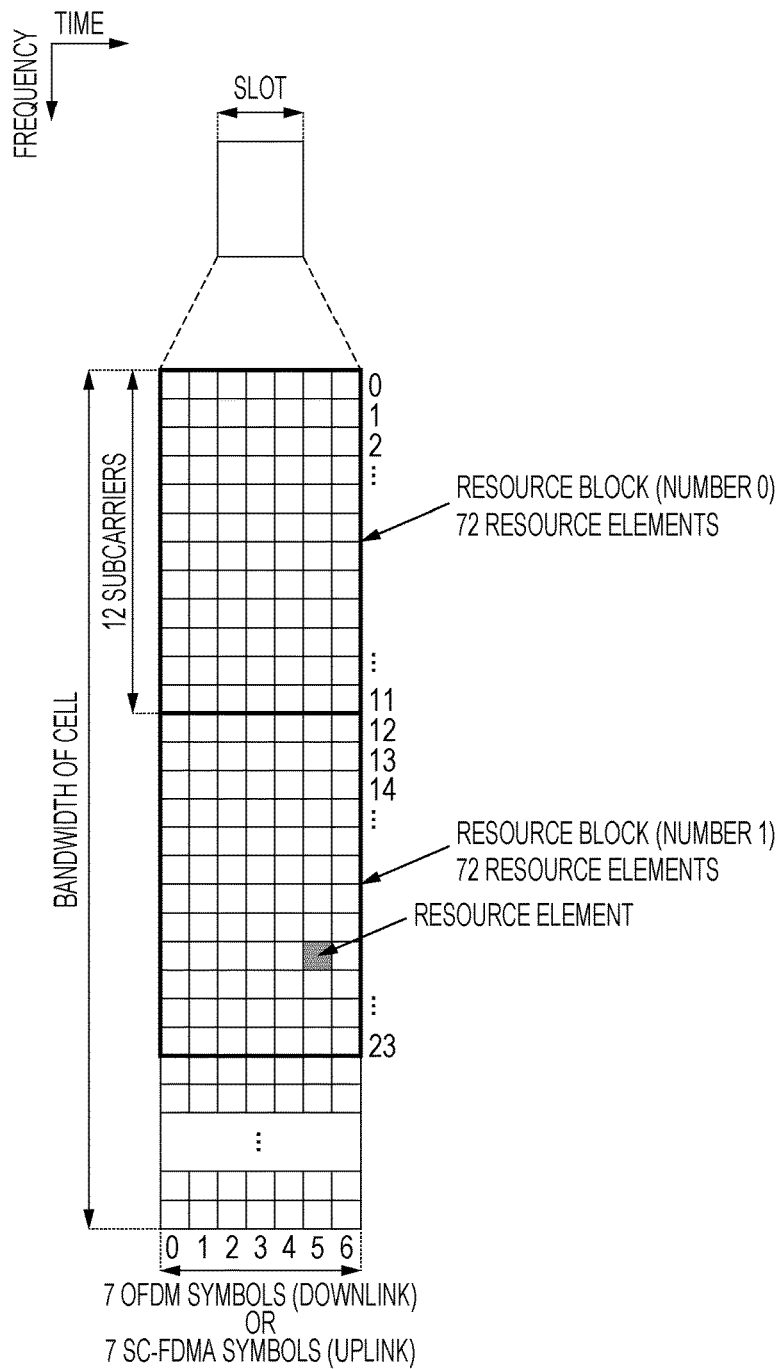
FIG. 3 is a diagram illustrating the structure of a slot.

FIG. 3 is a diagram illustrating the structure of the slot according to the embodiment. In FIG. 3, the horizontal axis is a time axis and the vertical axis is a frequency axis. In the embodiment, a normal CP (normal cyclic prefix) is applied to an OFDM symbol. Here, an extended CP (extended cyclic prefix) may also be applied to the OFDM symbol.

A physical signal or a physical channel transmitted in each slot is expressed by a resource grid. In a downlink, the resource grid is defined by a plurality of subcarriers and a plurality of OFDM symbols. In an uplink, the resource grid is defined by a plurality of subcarriers and a plurality of SC-FDMA symbols.

The number of subcarriers included in one slot depends on the bandwidth of a cell. For example, the number of OFDM symbols or SC-FDMA symbols included in one slot is 7. Here, each of the elements in the resource grid is referred to as a resource element. The resource element is identified using a subcarrier number and an OFDM symbol or SC-FDMA symbol number.

The resource block is used to express mapping to a resource element of a certain physical channel (PDSCH, PUSCH, or the like). For the resource blocks, a virtual resource block and a physical resource block are defined. A certain physical channel is first mapped to a virtual resource block. Thereafter, the virtual resource block is mapped to a physical resource block.

For example, one physical resource block is defined by 7 contiguous OFDM symbols or SC-FDMA symbols in a time region and 12 contiguous subcarriers in a frequency region. That is, one physical resource block includes (7□12) resource elements. One physical resource block corresponds to one slot in the time region and corresponds to 180 kHz in the frequency region. The physical resource block is numbered from 0 in the frequency region.

Hereinafter, the physical channels and the physical signals transmitted in the subframes will be described.

Figure 4:
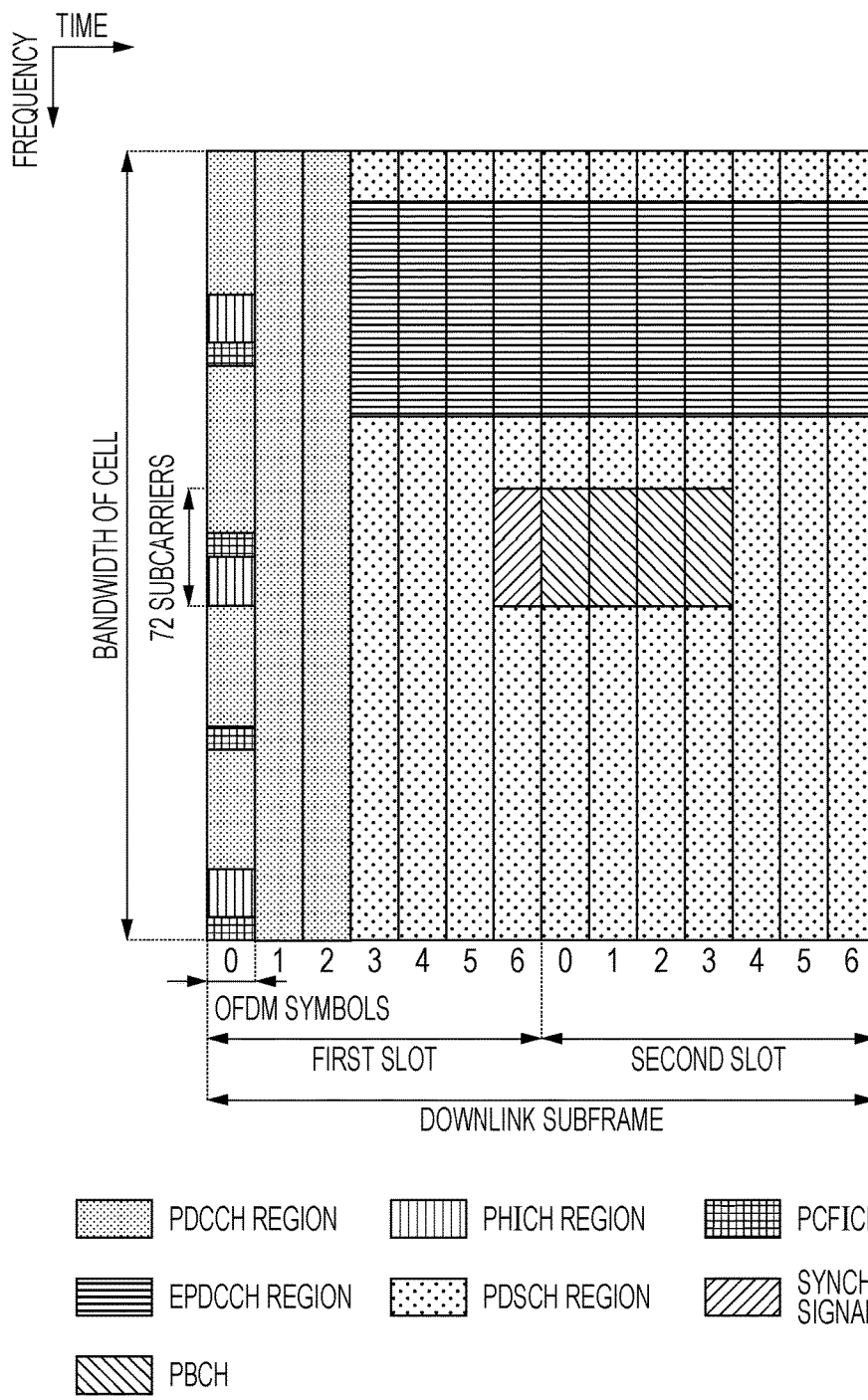
FIG. 4 is a diagram illustrating an example of arrangement of signals in a downlink subframe.

FIG. 4 is a diagram illustrating an example of arrangement of the physical channels and the physical signals in the downlink subframe according to the embodiment. In FIG. 4, the horizontal axis is a time axis and the vertical axis is a frequency axis. The base station apparatus 3 may transmit the downlink physical channels (the PBCH, the PCFICH, the PHICH, the PDCCH, the EPDCCH, and the PDSCH) and the downlink physical signals (the synchronization signal and the downlink reference signal) in the downlink subframe. Here, for example, the PBCH is transmitted only in subframe 0 in the radio frame. The downlink reference signal is arranged in the resource elements dispersed in the frequency region and the time region. To facilitate the description, the downlink reference signal is not illustrated in FIG. 4.

Here, in a PDCCH region, the plurality of PDCCHs may be subjected to frequency and time multiplexing. In an EPDCCH region, the plurality of EPDCCHs may be subjected to frequency, time, and spatial multiplexing. In a PDSCH area, the plurality of PDSCHs may be subjected to frequency and spatial multiplexing. The PDCCH and the PDSCH or EPDCCH may be subjected to time multiplexing. The PDSCH and the EPDCCH may be subjected to frequency multiplexing.

Figure 5:
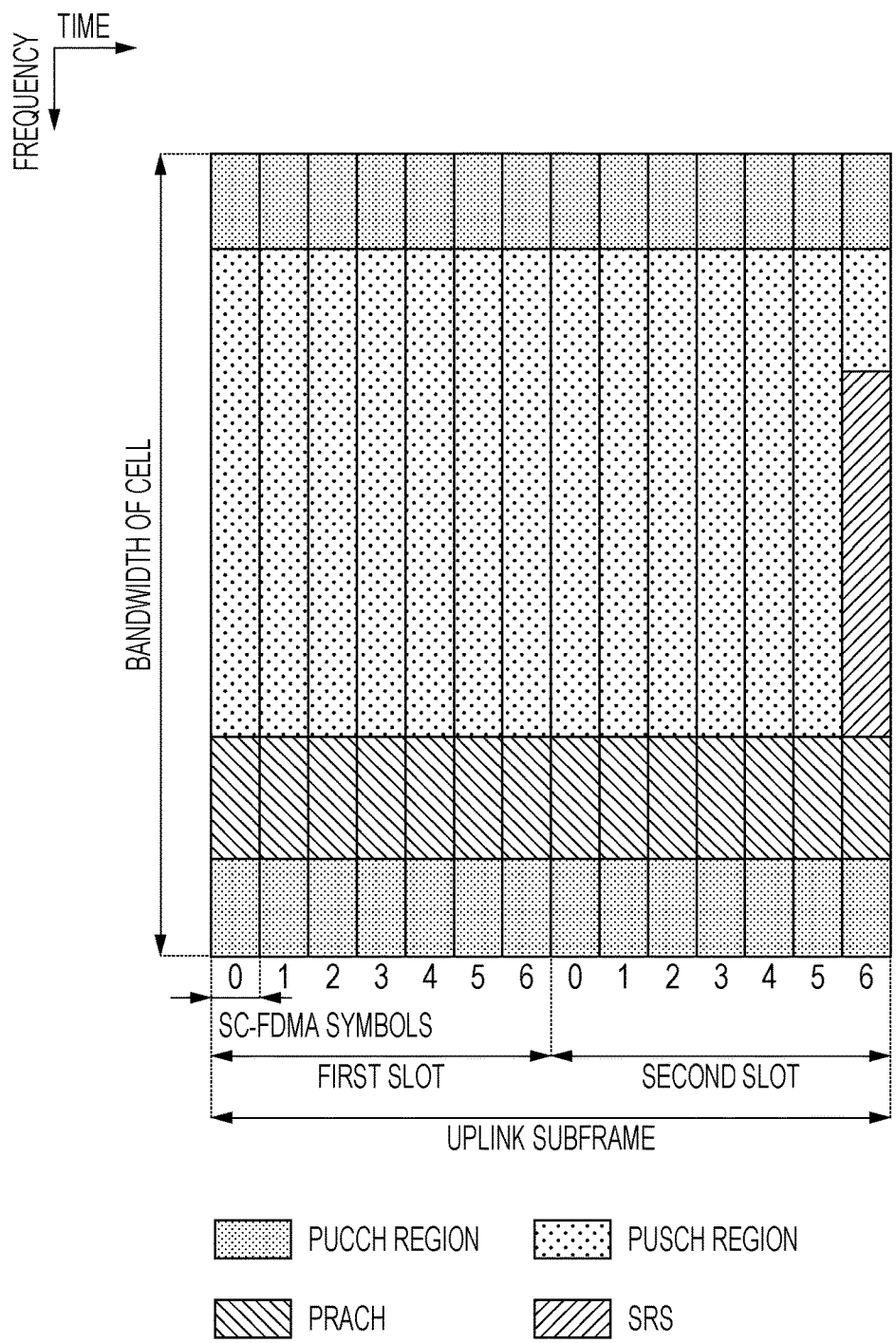
FIG. 5 is a diagram illustrating an example of arrangement of signals in an uplink subframe.

FIG. 5 is a diagram illustrating an example of arrangement of the physical channels and the physical signals in the uplink subframe according to the embodiment. In FIG. 5, the horizontal axis is a time axis and the vertical axis is a frequency axis. The terminal apparatus 1 may transmit the uplink physical channels (the PUCCH, the PUSCH, and the PRACH) and the uplink physical signals (the DMRS and the SRS) in the uplink subframe.

Here, in a PUCCH area, the plurality of PUCCHs are subjected to frequency, time, and code multiplexing. In a PUSCH area, the plurality of PUSCHs are subjected to frequency and spatial multiplexing. The PUCCH and the PUSCH may be subjected to frequency multiplexing. The PRACHs may be arranged in a single subframe or two subframes. The plurality of PRACHs may be subjected to code multiplexing.

The SRS is transmitted using the final SC-FDMA symbol in the uplink subframe. The terminal apparatus 1 may not simultaneously transmit the SRS and the PUCCH/PUSCH/PRACH in a single SC-FDMA symbol of a single cell. In the single uplink subframe of the single cell, the terminal apparatus 1 can transmit the PUSCH and/or the PUCCH using the SC-FDMA symbols excluding the final SC-FDMA symbol in this uplink subframe and can transmit the SRS using the final SC-FDMA symbol in this uplink subframe.

That is, the terminal apparatus 1 can transmit both of the SRS and the PUSCH/PUCCH in the single uplink subframe of the single cell. Here, the DMRS may be subjected to time multiplexing along with the PUCCH or the PUSCH. To simplify the description, the DMRS in FIG. 5 is not illustrated.

Figure 6:
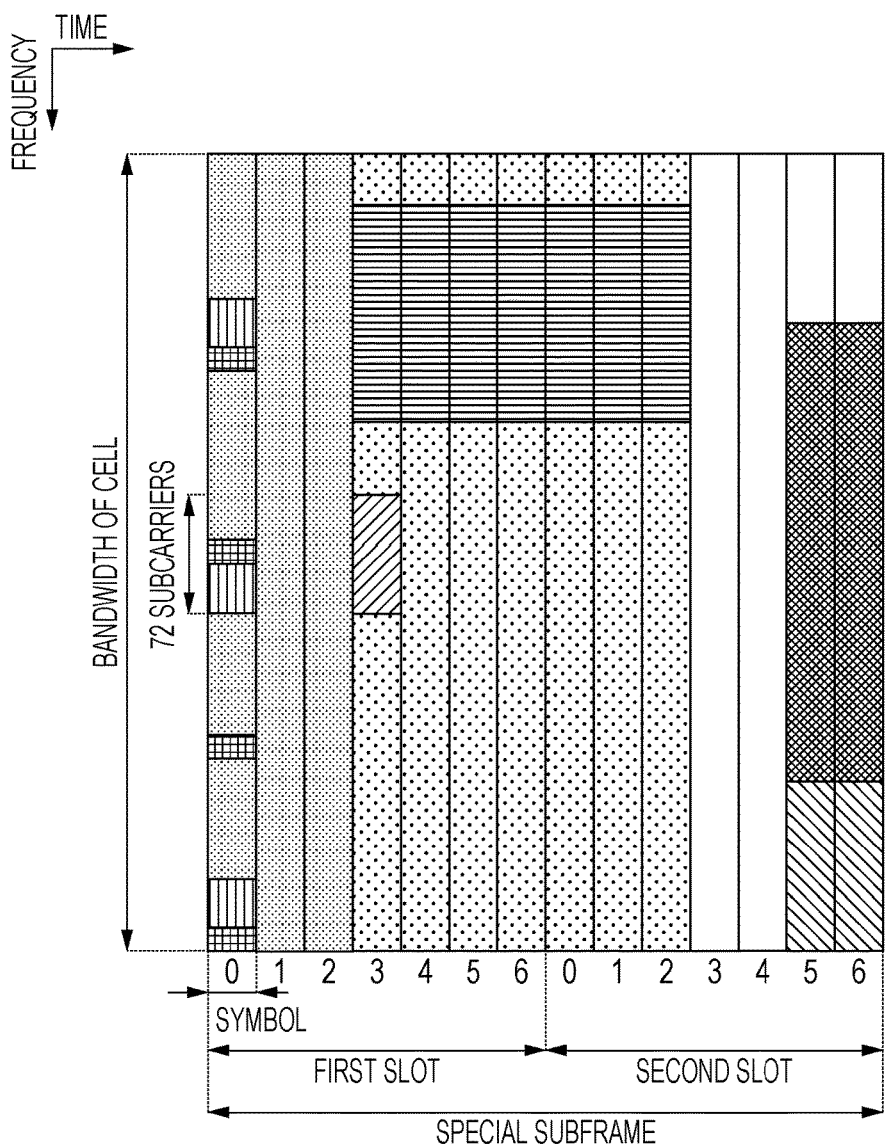
FIG. 6 is a diagram illustrating an example of arrangement of signals in a special subframe.

FIG. 6 is a diagram illustrating an example of arrangement of the physical channels and the physical signals in a special subframe according to the embodiment. In FIG. 6, the horizontal axis is a time axis and the vertical axis is a frequency axis. In FIG. 6, the DwPTS is configured to include first to tenth SC-FDMA symbols in the special subframe, the GP is configured to include eleventh and twelfth SC-FDMA symbols in the special subframe. The UpPTS is configured to include thirteen and fourteen SC-FDMA symbols in the special subframe.

The base station apparatus 3 may transmit the PCFICH, the PHICH, the PDCCH, the EPDCCH, the PDSCH, the synchronization signal, and the downlink reference signal in the DwPTS of the special subframe. The base station apparatus 3 does not transmit the PBCH in the DwPTS of the special subframe. The terminal apparatus 1 may transmit the PRACH and the SRS in the UpPTS of the special subframe.

That is, the terminal apparatus 1 does not transmit the PUCCH, the PUSCH, and the DMRS in the UpPTS of the special subframe.

Hereinafter, first uplink reference uplink-downlink (UL reference UL-DL) configuration, first downlink reference uplink-downlink (DL reference UL-DL) configuration, second UL reference UL-DL configuration, second DL reference UL-DL configuration, and transmission direction uplink-downlink (UL-DL) configuration will be described. Here, the transmission direction UL-DL configuration is also referred to as third UL-DL configuration.

For example, the first UL reference UL-DL configuration, the first DL reference UL-DL configuration, the second UL reference UL-DL configuration, the second DL reference UL-DL configuration, and the transmission direction UL-DL configuration are defined by uplink-downlink (UL-DL) configuration.

Here, the UL-DL configuration is configuration related to a pattern of the subframes in the radio frame. That is, the UL-DL configuration indicates that each of the subframes in the radio frame is one subframe of the downlink subframe, the uplink subframe, and the special subframe.

That is, the first UL reference UL-DL configuration, the second UL reference UL-DL configuration, the first DL reference UL-DL configuration, the second DL reference UL-DL configuration, and the transmission direction UL-DL configuration are defined by a pattern of the downlink subframe, the uplink subframe, and the special subframe in the radio frame.

For example, the pattern of the downlink subframe, the uplink subframe, and the special subframe indicates that each of subframes #0 to #9 is one of the downlink subframe, the uplink subframe, and the special subframe and is preferably expressed by any combination with a length 10 of D, U, and S (respectively representing the downlink subframe, the uplink subframe, and the special subframe). More preferably, the head (that is, subframe #0) is D and the second subframe (that is, subframe #1) is S.

FIG. 7 is a table illustrating an example of UL-DL configuration according to the embodiment. In FIG. 7, D represents the downlink subframe, U represents the uplink subframe, and S represents the special subframe.

Here, setting of UL-DL configuration i as the first or second UL reference UL-DL configuration is referred to as setting of first or second UL reference UL-DL configuration i. Setting of UL-DL configuration i as the first or second DL reference UL-DL configuration is referred to as setting of first or second DL reference UL-DL configuration i. Setting of UL-DL configuration i as the transmission direction UL-DL configuration is referred to as setting of transmission direction UL-DL configuration i.

Setting of UL-DL configuration i as the UL reference UL-DL configuration is referred to as setting of UL reference UL-DL configuration i. Setting of UL-DL configuration i as the DL reference UL-DL configuration is referred to as setting of DL reference UL-DL configuration i.

Hereinafter, methods of setting the first UL reference UL-DL configuration, the first DL reference UL-DL configuration, and the transmission direction UL-DL configuration will be described.

The base station apparatus 3 sets the first UL reference UL-DL configuration, the first DL reference UL-DL configuration, and the transmission direction UL-DL configuration.

The base station apparatus 3 may include first information (TDD-Config) indicating the first UL reference UL-DL configuration in at least one of an MIB, a system information block type 1 message, a system information message, an RRC message, a MAC control element (CE), and control information (for example, the DCI format) of the physical layer to transmit the first information to the terminal apparatus 1.

The base station apparatus 3 may include second information indicating the first DL reference UL-DL configuration in at least one of an MIB, a system information block type 1 message, a system information message, an RRC message, a MAC CE (control element), and control information (for example, the DCI format) of the physical layer to transmit the first information to the terminal apparatus 1.

The base station apparatus 3 may include third information indicating the transmission direction UL-DL configuration in at least one of an MIB, a system information block type 1 message, a system information message, an RRC message, a MAC CE (control element), and control information (for example, the DCI format) of the physical layer to transmit the first information to the terminal apparatus 1.

Here, for each of the plurality of serving cells, the first UL reference UL-DL configuration, the second UL reference UL-DL configuration, the first DL reference UL-DL configuration, the second DL reference UL-DL configuration, and the transmission direction UL-DL configuration may be defined.

That is, the base station apparatus 3 may transmit the first information, the second information, and the third information regarding each cell to the terminal apparatus 1 in which the plurality of cells are set. For each cell, the first information, the second information, and the third information may be set.

That is, the terminal apparatus 1 in which the plurality of cells are set may set the first UL reference UL-DL configuration, the first DL reference UL-DL configuration, and the transmission direction DL-UL configuration for each cell based on the first information, the second information, and the third information.

For example, the first information regarding the primary cell is preferably included in the system information block type 1 message or the RRC message. The first information regarding the secondary cell is preferably included in the RRC message.

The second information regarding the primary cell is preferably included in the system information block type 1 message, the system information message, or the RRC message. The second information regarding the secondary cell is preferably included in the RRC message. The third information is preferably included in the control information (for example, the DCI format) of the physical layer.

Figure 8:
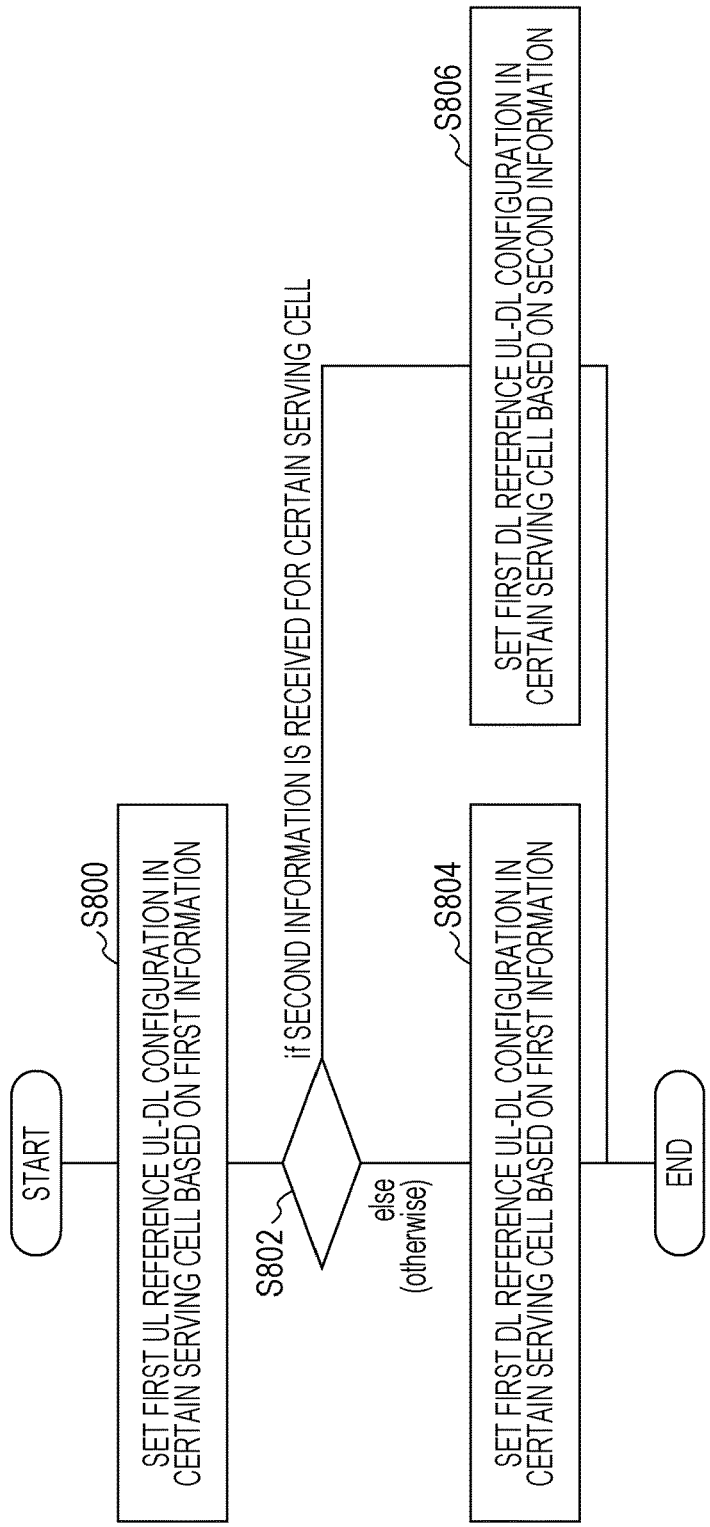
FIG. 8 is a flowchart illustrating a method of setting a first UL reference UL-DL configuration and a first DL reference UL-DL configuration.

FIG. 8 is a flowchart illustrating a method of setting the first UL reference UL-DL configuration and the first DL reference UL-DL configuration according to the embodiment. The terminal apparatus 1 may performs the setting method in FIG. 8 on each of the plurality of cells.

The terminal apparatus 1 sets the first UL reference UL-DL configuration in a certain cell based on the first information (S800). The terminal apparatus 1 determines whether the second information is received for the certain cell (S802). Here, when the terminal apparatus 1 receives the second information for the certain cell, the terminal apparatus 1 sets the first DL reference UL-DL configuration in the certain cell based on the second information regarding the certain cell (S806). When the terminal apparatus 1 does not receive the second information for the certain cell (else/otherwise), the terminal apparatus 1 sets the first DL reference UL-DL configuration in the certain cell based on the first information for the certain cell (S804).

Here, a cell for which the first UL reference UL-DL configuration and the first DL reference UL-DL configuration are set based on the first information is also referred to as a cell in which the dynamic TDD is not set. A cell for which the first DL reference UL-DL configuration is set based on the second information is also referred to as a cell in which the dynamic TDD is set.

When the second information for a certain cell is not received, the first UL reference UL-DL configuration and the first DL reference UL-DL configuration may not be defined. That is, when the terminal apparatus 1 does not receive the second information for a certain cell, one UL-DL configuration may be set for the certain cell based on the first information for the certain cell.

The terminal apparatus 1 receives the second information and determines the subframe in which uplink transmission is possible based on the second information. Next, the terminal apparatus 1 monitors the third information. When the terminal apparatus 1 receives the third information, the terminal apparatus 1 determines the subframe in which uplink transmission is possible based on the third information.

For example, the base station apparatus 3 may transmit the third information to the terminal apparatus 1 using the PDCCH/EPDCCH. That is, the third information may be used for the base station apparatus 3 (cell) to control an operation of the dynamic TDD within a coverage. Here, the third information may be transmitted and received in the CSS and/or the USS.

The terminal apparatus 1 tries to decode the received signal and determines whether the PDCCH/EPDCCH (the DCI format may be used) in which the third information is transmitted is detected. When the PDCCH/EPDCCH in which the third information is transmitted is detected, the terminal apparatus 1 determines the subframe in which the uplink transmission is possible based on the detected third information. When the PDCCH/EPDCCH in which the third information is transmitted is not detected, the terminal apparatus 1 determines may maintain the previous determination on the subframe in which the uplink transmission is possible.

Hereinafter, a method of setting the second UL reference UL-DL configuration will be described.

When the plurality of cells are set in the terminal apparatus 1 and the first UL reference UL-DL configuration is different between at least two cells, the base station apparatus 3 and the terminal apparatus 1 may set the second UL reference UL-DL configuration.

The base station apparatus 3 and the terminal apparatus 1 may not set the second UL reference UL-DL configuration except that the plurality of cells are set in the terminal apparatus 1 and the first UL reference UL-DL configuration is different between at least two cells. Here, the case in which the first UL reference UL-DL configuration is the same in the all serving cells (for example, two serving cells) except that the first UL reference UL-DL configuration is different between at least two serving cells.

The base station apparatus 3 and the terminal apparatus 1 may not set the second UL reference UL-DL configuration when (only) one cell is set in the terminal apparatus 1.

Figure 9:
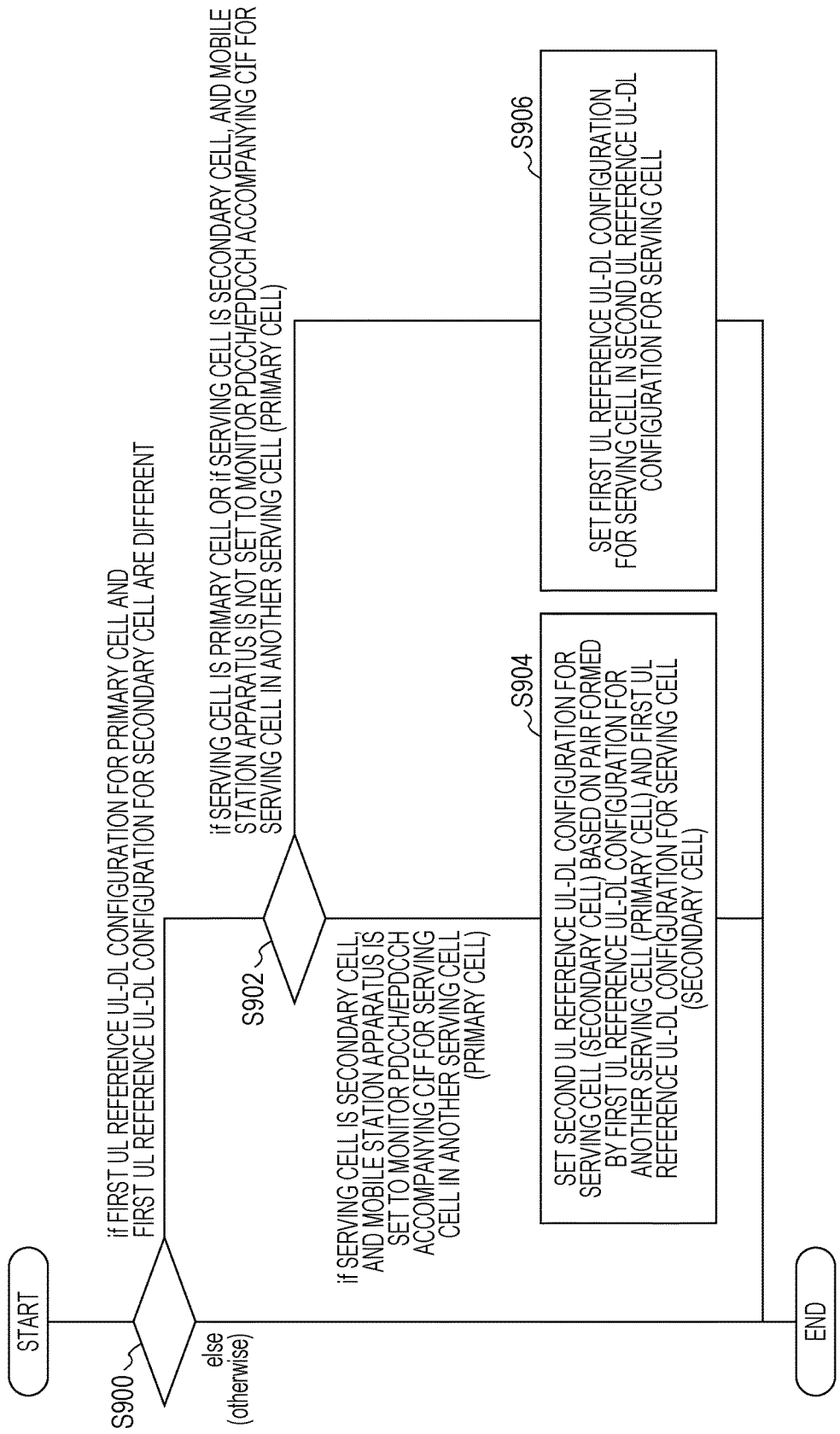
FIG. 9 is a flowchart illustrating a method of setting a second UL reference UL-DL configuration.

FIG. 9 is a flowchart illustrating the method of setting the second UL reference UL-DL configuration according to the embodiment. FIG. 9 illustrates a case in which one primary cell and one secondary cell are set in the terminal apparatus 1. Here, the terminal apparatus 1 may also perform the setting method in FIG. 9 on each of the primary cell and the secondary cell.

The terminal apparatus 1 determines whether the first UL reference UL-DL configuration for the primary cell and the first UL reference UL-DL configuration for the secondary cell are different (S900). Here, when the first UL reference UL-DL configuration for the primary cell and the first UL reference UL-DL configuration for the secondary cell are the same, the terminal apparatus 1 does not set the second UL reference UL-DL configuration and ends the process of setting the second UL reference UL-DL configuration.

When the first UL reference UL-DL configuration for the primary cell and the first UL reference UL-DL configuration for the secondary cell are different, the terminal apparatus 1 determines whether the serving cell is the primary cell or the secondary cell and/or the terminal apparatus 1 is set to monitor PDCCH/EPDCCH accompanying a CIF (Carrier Indicator Field) for the serving cell in another serving cell (S902).

Here, when the serving cell is the secondary cell and the terminal apparatus 1 is set to monitor the PDCCH/EPDCCH accompanying the CIF for the serving cell (the secondary cell) in another serving cell (that is, the primary cell), the second UL reference UL-DL configuration for the serving cell (secondary cell) is set based on a pair formed by the first UL reference UL-DL configuration for another serving cell (primary cell) and the first UL reference UL-DL configuration for the serving cell (secondary cell) (S904).

For example, in S904, the terminal apparatus 1 sets the second UL reference UL-DL configuration for the serving cell (secondary cell) based on the table of FIG. 10. FIG. 10 is a diagram illustrating the pair formed by the first UL reference UL-DL configuration for another serving cell (primary cell) and the first UL reference UL-DL configuration for the serving cell (secondary cell) and correspondence to the second UL reference UL-DL configuration for the secondary cell.

In FIG. 10, primary cell UL-DL configuration is performed with reference to the first UL reference UL-DL configuration for another serving cell (primary cell). Further, the secondary UL-DL configuration is performed with reference to the first UL reference UL-DL configuration for the serving cell (secondary cell).

For example, when first UL reference UL-DL configuration 0 is set for another serving cell (primary cell) and first UL reference UL-DL configuration 2 is set for the serving cell (secondary cell), second UL reference UL-DL configuration 1 is set for the secondary cell.

When the serving cell is the primary cell or the serving cell is the secondary cell and the terminal apparatus 1 is not set to monitor the PDCCH/EPDCCH accompanying the CIF for the serving cell (secondary cell) in another serving cell (that is, the primary cell), the first UL reference UL-DL configuration for the serving cell is set in the second UL reference UL-DL configuration for the serving cell (S906).

Similarly, the base station apparatus 3 sets the second UL reference UL-DL configuration based on the setting method illustrated in FIG. 9.

Here, the monitoring of the PDCCH/EPDCCH accompanying the CIF includes a meaning that decoding of the PDCCH or the EPDCCH is tried according to the DCI format including the CIF. The CIF indicates a field to which the carrier indicator is mapped. The value of the carrier indicator indicates a serving cell to which the DCI format associated with the carrier indicator corresponds.

That is, in another serving cell, the terminal apparatus 1 set to monitor the PDCCH/EPDCCH accompanying the CIF to correspond to the serving cell monitors the PDCCH/EPDCCH accompanying the CIF in the other serving cell.

In another serving cell, the terminal apparatus 1 set to monitor the PDCCH/EPDCCH accompanying the CIF to correspond to the serving cell preferably receive the third information for the serving cell via the PDCCH/EPDCCH in the other serving cell.

In another serving cell, the terminal apparatus 1 not set to monitor the PDCCH/EPDCCH accompanying the CIF to correspond to the serving cell may monitor the PDCCH/EPDCCH accompanying the CIF or not accompanying the CIF in the other serving cell.

In another serving cell, the terminal apparatus 1 not set to monitor the PDCCH/EPDCCH accompanying the CIF to correspond to the serving cell preferably receive the third information for the serving cell via the PDCCH/EPDCCH in the other serving cell.

Here, the PDCCH/EPDCCH (the DCI format may be used) for the primary cell is transmitted in the primary cell. That is, the third information for the primary cell is preferably transmitted via the PDCCH/EPDCCH of the primary cell.

The base station apparatus 3 may transmit a parameter (cif-Presence-r10) indicating whether the DCI format transmitted in the primary cell includes the CIF to the terminal apparatus 1. The base station apparatus 3 may transmit a parameter (CrossCarrierSchedulingConfig-r10) associated with cross carrier scheduling in each secondary cell to the terminal apparatus 1.

Here, the parameter (CrossCarrierSchedulingConfig-r10) may include a parameter (schedulingCellInfo-r10) indicating whether the PDCCH/EPDCCH corresponding to the associated secondary cell is transmitted in the secondary cell or is transmitted in another serving cell.

When the parameter (schedulingCellInfo-r10) indicates that the PDCCH/EPDCCH corresponding to the associated secondary cell is transmitted in the secondary cell, the parameter (schedulingCellInfo-r10) may include the parameter (cif-Presence-r10) indicating whether the DCI format transmitted in the secondary cell includes the CIF.

When the parameter (schedulingCellInfo-r10) indicates that the PDCCH/EPDCCH corresponding to the associated secondary cell is transmitted in another serving cell, the parameter (schedulingCellInfo-r10) may include a parameter (schedulingCellId) indicating in which serving cell the downlink assignment or the uplink grant for the associated secondary cell is transmitted.

Hereinafter, a method of setting the second DL reference UL-DL configuration will be described.

For example, when the plurality of cells are set in the terminal apparatus 1 and the first DL reference UL-DL configuration is different between at least two cells, the base station apparatus 3 and the terminal apparatus 1 sets the second DL reference UL-DL configuration.

The base station apparatus 3 and the terminal apparatus 1 may not set the second DL reference UL-DL configuration except that the plurality of cells are set in the terminal apparatus 1 and the first DL reference UL-DL configuration is different between at least two cells. Here, the case in which the first DL reference UL-DL configuration is the same in the all serving cells (for example, two serving cells) may be included except that the first DL reference UL-DL configuration is different between at least two serving cells.

The base station apparatus 3 and the terminal apparatus 1 may not set the second DL reference UL-DL configuration when (only) one cell is set in the terminal apparatus 1.

Figure 11:
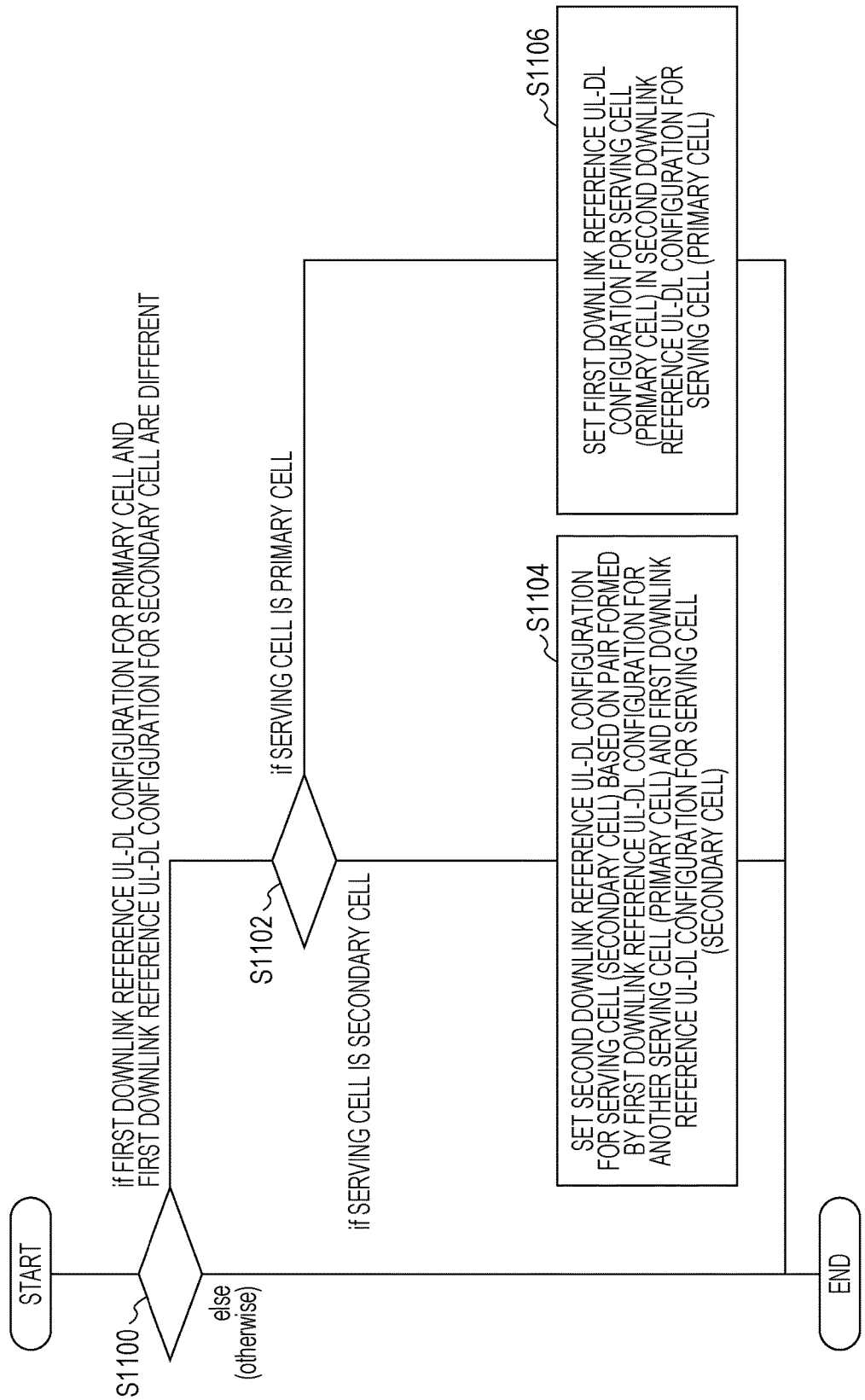
FIG. 11 is a flowchart illustrating a method of setting a second DL reference UL-DL configuration.

FIG. 11 is a flowchart illustrating a method of setting the second DL reference UL-DL configuration according to the embodiment. FIG. 11 illustrates a case in which one primary cell and one secondary cell are set in the terminal apparatus 1. The terminal apparatus 1 may performs the setting method in FIG. 11 on the primary cell and the secondary cell.

The terminal apparatus 1 determines whether the first DL reference UL-DL configuration for the primary cell and the first DL reference UL-DL configuration for the secondary cell are different (S1100). Here, when the first DL reference UL-DL configuration for the primary cell and the first DL reference UL-DL configuration for the secondary cell are the same, the terminal apparatus 1 does not set the second DL reference UL-DL configuration and ends the process of setting the second DL reference UL-DL configuration.

When the first DL reference UL-DL configuration for the primary cell and the first DL reference UL-DL configuration for the secondary cell are different, the terminal apparatus 1 determines whether the serving cell is the primary cell or the secondary cell (S1102).

Here, when the serving cell is the secondary cell, the second UL reference UL-DL configuration for the serving cell (secondary cell) is set based on a pair formed by the first DL reference UL-DL configuration for another serving cell (that is, the primary cell) and the first DL reference UL-DL configuration for the serving cell (secondary cell) (S1104).

For example, in S1104, the terminal apparatus 1 sets the second DL reference UL-DL configuration for the serving cell (secondary cell) based on the table of FIG. 12. FIG. 12 is a diagram illustrating the pair formed by the first DL reference UL-DL configuration for the primary cell and the first DL reference UL-DL configuration for the secondary cell and correspondence to the second DL reference UL-DL configuration for the secondary cell.

In FIG. 12, the primary cell UL-DL configuration is performed with reference to the first DL reference UL-DL configuration for the primary cell. The secondary cell UL-DL configuration is performed with reference to the first DL reference UL-DL configuration for the secondary cell.

For example, when the pair formed by the first DL reference UL-DL configuration for the primary cell and the first DL reference UL-DL configuration for the secondary cell belongs to set 1 in FIG. 12, the second DL reference UL-DL configuration for the secondary cell is defined in set 1.

For example, when the terminal apparatus 1 is not set to monitor the PDCCH/EPDCCH accompanying the CIF for the secondary cell in the primary cell and the pair formed by the first DL reference UL-DL configuration for the primary cell and the first DL reference UL-DL configuration for the primary cell and the first DL reference UL-DL configuration for the secondary cell belongs to set 2 in FIG. 12, the second DL reference UL-DL configuration for the secondary cell is defined in set 2.

When first DL reference UL-DL configuration 1 is set for the primary cell and first DL reference UL-DL configuration 0 is set for the secondary cell, second DL reference UL-DL configuration 1 is set for the secondary cell.

When the serving cell is the primary cell, the first DL reference UL-DL configuration for the serving cell (primary cell) is set in the second DL reference UL-DL configuration for the serving cell (primary cell) (S1106).

Similarly, the base station apparatus 3 sets the second DL reference UL-DL configuration based on the setting method illustrated in FIG. 11.

Hereinafter, the first UL reference UL-DL configuration will be described.

The first UL reference UL-DL configuration is used at least to specify the subframe in which uplink transmission is possible or may not be possible in a cell. Here, 'specifying' to be described below includes meanings of at least "deciding," "selecting", and "indicating".

For example, the terminal apparatus 1 does not perform uplink transmission in the subframe indicated as the downlink subframe using the first UL reference UL-DL configuration. The terminal apparatus 1 does not perform uplink transmission in the DwPTS and the GP of the subframe indicated as the special subframe using the first UL reference UL-DL configuration.

Hereinafter, the first DL reference UL-DL configuration will be described.

The first DL reference UL-DL configuration is used at least to specify the subframe in which downlink transmission is possible or may not be possible in a cell.

For example, the terminal apparatus 1 does not perform downlink transmission in the subframe indicated as the uplink subframe using the first DL reference UL-DL configuration. The terminal apparatus 1 does not perform downlink transmission in the UpPTS and the GP of the subframe indicated as the special subframe using the first DL reference UL-DL configuration.

The terminal apparatus 1 setting the first DL reference UL-DL configuration based on the first information may perform measurement (for example, measurement related to channel state information) using a downlink signal in the DwPTS of the special subframe or the downlink subframe indicated using the first UL reference UL-DL configuration or the first DL reference UL-DL configuration.

Here, the subframe indicated as the uplink subframe using the first UL reference UL-DL configuration and indicated as the downlink subframe using the first DL reference UL-DL configuration is also referred to as a first flexible subframe. The first flexible subframe may be a subframe reserved for uplink transmission and downlink transmission.

The subframe indicated as the special subframe using the first UL reference UL-DL configuration and indicated as the downlink subframe using the first DL reference UL-DL configuration is also referred to as a second flexible subframe. The second flexible subframe may be a subframe reserved for downlink transmission. The second flexible subframe may be a subframe reserved for downlink transmission in the DwPTS and for uplink transmission in the UpPTS.

The subframe indicated as the uplink subframe using the first UL reference UL-DL configuration and indicated as the uplink subframe using the first DL reference UL-DL configuration is also referred to as a fixed uplink subframe. The fixed uplink subframe is reserved for uplink transmission.

Hereinafter, the transmission direction UL-DL configuration will be described.

The base station apparatus 3 and the terminal apparatus 1 set the transmission direction UL-DL configuration related to transmission directions (up/down) in the subframe. For example, the transmission direction UL-DL configuration is used to specify the transmission direction in the subframe. The transmission direction UL-DL configuration may be used for the first UL reference UL-DL configuration and the first DL reference UL-DL configuration and may be used to specify a transmission direction in the subframe indicated as another subframe.

That is, the terminal apparatus 1 controls the transmission of the first flexible subframe and the second flexible subframe based on scheduling information (the DCI format and/or the HARQ-ACK) and the transmission direction UL-DL configuration.

For example, the third information indicating the transmission direction UL-DL configuration may be information for indicating the subframe in which uplink transmission is possible. The third information may also be information for indicating the subframe in which downlink transmission is possible. The third information may be information for indicating the subframe in which uplink transmission in the UpPTS and downlink transmission in the DwPTS are possible.

The base station apparatus 3 may schedule downlink transmission in the subframe indicated as the downlink subframe using the transmission direction UL-DL configuration. The terminal apparatus 1 may perform a downlink reception process in the subframe indicated as the downlink subframe using the transmission direction UL-DL configuration.

The base station apparatus 3 may also schedule uplink transmission in the subframe indicated as the uplink subframe using the transmission direction UL-DL configuration. The terminal apparatus 1 may perform an uplink transmission process in the subframe indicated as the uplink subframe using the transmission direction UL-DL configuration.

The base station apparatus 3 may schedule downlink transmission in the DwPTS of the subframe indicated as the special subframe using the transmission direction UL-DL configuration. The terminal apparatus 1 may perform a downlink reception process in the DwPTS of the subframe indicated as the special subframe using the transmission direction UL-DL configuration.

Hereinafter, the first UL reference UL-DL configuration and the second UL reference UL-DL configuration will be described.

The first UL reference UL-DL configuration and the second UL reference UL-DL configuration may be used to specify correspondence between a subframe n in which the PDCCH/EPDCCH/PHICH are arranged and a subframe n+k in which the PUSCHs corresponding to the PDCCH/EPDCCH/PHICH are arranged.

For example, when one primary cell is set or when one primary cell and one secondary cell are set and the first UL reference UL-DL configuration for the primary cell and the first UL reference UL-DL configuration for the secondary cell are the same, the corresponding first UL reference UL-DL configuration is used in two serving cells to specify correspondence between the subframe in which the PDCCH/EPDCCH/PHICH are arranged and the subframe in which the PUSCHs corresponding to the PDCCH/EPDCCH/PHICH are arranged.

When one primary cell and one secondary cell are set and the first UL reference UL-DL configuration for the primary cell and the first UL reference UL-DL configuration for the secondary cell are different, the corresponding second UL reference UL-DL configuration is used in two serving cells to specify correspondence between the subframe in which the PDCCH/EPDCCH/PHICH are arranged and the subframe in which the PUSCHs corresponding to the PDCCH/EPDCCH/PHICH are arranged.

FIG. 13 is a diagram illustrating correspondence between subframe n in which the PDCCH/EPDCCH/PHICH are arranged and subframe n+k in which the PUSCHs corresponding to the PDCCH/EPDCCH/PHICH are arranged according to the embodiment. The terminal apparatus 1 specifies the value of k with reference to the table of FIG. 13.

In FIG. 13, when one primary cell is set or when one primary cell and one secondary cell are set and the first UL reference UL-DL configuration for the primary cell and the first UL reference UL-DL configuration for the secondary cell are the same, the first UL reference UL-DL configuration is referred as the UL reference UL-DL configuration.

When one primary cell and one secondary cell are set and the first UL reference UL-DL configuration for the primary cell and the first UL reference UL-DL configuration for the secondary cell are different, the second UL reference UL-DL configuration is referred as the UL reference UL-DL configuration.

Hereinafter, in the description of FIG. 13, the first UL reference UL-DL configuration and the second UL reference UL-DL configuration are simply referred to as the UL-DL configurations.

For example, when the terminal apparatus 1 detects the PDCCH/EPDCCH with the uplink grant targeting the terminal apparatus 1 for the cell in UL-DL configurations 1 to 6 are set in subframe n, the terminal apparatus 1 performs transmission on the PUSCH corresponding to the uplink grant in subframe n+k specified based on the table of FIG. 13.

When the terminal apparatus 1 detects the PHICH accompanying the NACK that targets the terminal apparatus 1 in subframe n for the cell in which UL-DL configurations 1 to 6 are set, the terminal apparatus 1 performs transmission on the PUSCH in subframe n+k specified based on the table of FIG. 13.

The uplink grant targeting the terminal apparatus 1 includes a 2-bit uplink index (UL index) for the cell in which UL-DL configuration 0 is set. The uplink grant targeting the terminal apparatus 1 does not include an uplink index (UL index) for the cell in which UL-DL configurations 1 to 6 are set.

When the MSB (most significant bit) of the uplink index included in the uplink grant corresponding to the cell in which UL-DL configuration 0 is set is set to 1 in subframe n, the terminal apparatus 1 performs transmission on the PUSCH corresponding to the uplink grant in subframe n+k specified based on the table of FIG. 13 (adjusts the transmission on the PUSCH).

When the PHICH accompanying the NACK corresponding to the cell in which UL-DL configuration 0 is set is received in a first resource set in subframe n=0 or 5, the terminal apparatus 1 performs the transmission on the PUSCH according to the PHICH in subframe n+k specified based on the table of FIG. 13.

When the LSB (least significant bit) of the uplink index included in the uplink grant corresponding to the cell in which UL-DL configuration 0 is set is set to 1 in subframe n, the terminal apparatus 1 performs transmission on the PUSCH corresponding to the uplink grant in subframe n+7.

When the PHICH accompanying the NACK corresponding to the cell in which UL-DL configuration 0 is set is received in a second resource set in subframe n=0 or 5, the terminal apparatus 1 performs the transmission on the PUSCH corresponding to the uplink grant in subframe n+7.

When the PHICH accompanying the NACK corresponding to the cell in which UL-DL configuration 0 is set is received in subframe n=1 or 6, the terminal apparatus 1 performs the transmission on the PUSCH corresponding to the uplink grant in subframe n+7.

For example, when the terminal apparatus 1 detects the PDCCH/EPDCCH/PHICH corresponding to the cell in which the UL-DL configuration 0 is set in [SFN=m, subframe 1], the terminal apparatus 1 performs the transmission of the PUSCH in the subframe [SFN=m, subframe 7] located later by 6 subframes.

The first UL reference UL-DL configuration and the second UL reference UL-DL configuration may be used to specify the correspondence between subframe n in which the PUSCH is arranged and subframe n+k in which the PHICH corresponding to the PUSCH is arranged.

That is, for example, when one primary cell is set or when one primary cell and one secondary cell are set and the first UL reference UL-DL configuration for the primary cell and the first UL reference UL-DL configuration for the secondary cell are the same, the corresponding first UL reference UL-DL configuration is used in two serving cells to specify the correspondence between subframe n in which the PUSCH is arranged and subframe n+k in which the PHICH corresponding to the PUSCH is arranged.

When one primary cell and one secondary cell are set and the first UL reference UL-DL configuration for the primary cell and the first UL reference UL-DL configuration for the secondary cell are different, the corresponding second UL reference UL-DL configuration is used in two serving cells to specify the correspondence between subframe n in which the PUSCH is arranged and subframe n+k in which the PHICH corresponding to the PUSCH is arranged.

FIG. 14 is a diagram illustrating correspondence between subframe n in which the PUSCH is arranged and subframe n+k in which the PUSCH corresponding to the PHICH is arranged according to the embodiment. The terminal apparatus 1 specifies the value of k with reference to the table of FIG. 14.

In FIG. 14, when one primary cell is set or when one primary cell and one secondary cell are set and the first UL reference UL-DL configuration for the primary cell and the first UL reference UL-DL configuration for the secondary cell are the same, the first UL reference UL-DL configuration is referred as the UL reference UL-DL configuration.

When one primary cell and one secondary cell are set and the first UL reference UL-DL configuration for the primary cell and the first UL reference UL-DL configuration for the secondary cell are different, the second UL reference UL-DL configuration is referred as the UL reference UL-DL configuration.

Hereinafter, in the description of FIG. 14, the first UL reference UL-DL configuration and the second UL reference UL-DL configuration are simply referred to as the UL-DL configurations.

When the transmission on the PUSCH is scheduled in subframe n, the terminal apparatus 1 specifies the PHICH resource in subframe n+k specified from the table of FIG. 14.

For example, when the transmission on the PUSCH is scheduled in [SFN=m, subframe n=2] in the cell in which UL-DL configuration 0 is set, the PHICH resource in [SFN=m, subframe n=6] is specified.

Hereinafter, the first DL reference UL-DL configuration and the second DL reference UL-DL configuration will be described.

The first DL reference UL-DL configuration and the second DL reference UL-DL configuration are used to specify the correspondence between subframe n in which the PDSCH is arranged and subframe n+k in which the HARQ-ACK corresponding to the PDSCH is transmitted.

For example, when one primary cell is set or when one primary cell and one secondary cell are set and the first DL reference UL-DL configuration for the primary cell and the first DL reference UL-DL configuration for the secondary cell are the same, the corresponding first DL reference UL-DL configuration is used in two serving cells to specify the correspondence between subframe n in which the PDSCH is arranged and subframe n+k in which the HARQ-ACK corresponding to the PDSCH is transmitted.

When one primary cell and one secondary cell are set and the first DL reference UL-DL configuration for the primary cell and the first DL reference UL-DL configuration for the secondary cell are different, the corresponding second DL reference UL-DL configuration is used in two serving cells to specify the correspondence between subframe n in which the PDSCH is arranged and subframe n+k in which the HARQ-ACK corresponding to the PDSCH is transmitted.

FIG. 15 is a diagram illustrating correspondence between subframe n-k in which the PDSCH is arranged and subframe n in which the HARQ-ACK corresponding to the PDSCH is transmitted according to the embodiment. The terminal apparatus 1 specifies the value of k with reference to the table of FIG. 15.

In FIG. 15, when one primary cell is set or when one primary cell and one secondary cell are set and the first DL reference UL-DL configuration for the primary cell and the first DL reference UL-DL configuration for the secondary cell are the same, the first DL reference UL-DL configuration is referred as the DL reference UL-DL configuration.

When one primary cell and one secondary cell are set and the first DL reference UL-DL configuration for the primary cell and the first DL reference UL-DL configuration for the secondary cell are different, the second DL reference UL-DL configuration is referred as the DL reference UL-DL configuration.

Hereinafter, in the description of FIG. 15, the first DL reference UL-DL configuration and the second DL reference UL-DL configuration are simply referred to as the UL-DL configurations.

When the terminal apparatus 1 is a target in subframe n-k (where k is specified by the table of FIG. 15) of the serving cell and the transmission of the PDSCH in which the corresponding HARQ-ACK is to be transmitted is detected, the terminal apparatus 1 transmits the HARQ-ACK in subframe n.

Here, for example, the terminal apparatus 1 does not respond to the HARQ-ACK to the transmission of the PDSCH used for transmission of the system information. Further, the terminal apparatus 1 responds to the HARQ-ACK to the transmission of the PDSCH scheduled by the DCI format accompanying the CRC scrambled by the C-RNTI.

The terminal apparatus 1 transmits the HARQ-ACK in subframe n=2 in response to the PDSCH received in subframe n−6 and/or n−7 in the cell in which UL-DL configuration 1 is set.

Here, when the second information is not received, the first DL reference UL-DL configuration may not be defined. In this case, based on the first DL reference UL-DL configuration (serving cell UL-DL configuration), the terminal apparatus 1 and the base station apparatus 3 may perform a process performed based on the above-described first DL reference UL-DL configuration.

For example, when one primary cell and one secondary cell are set, the second information for the primary cell is not received, the second information for the secondary cell is received, the second information for the secondary cell is received, the first UL reference UL-DL configuration (the serving cell UL-DL configuration) for the primary cell and the first DL reference UL-DL configuration for the secondary cell are different, and the serving cell is the secondary cell, the second DL reference UL-DL configuration for the serving cell (secondary cell) may be set by the pair formed by the first UL reference UL-DL configuration for another serving cell (primary cell) and the first DL reference UL-DL configuration for the serving cell (secondary cell).

When one primary cell and one secondary cell are set, the second information for the primary cell is not received, the second information for the secondary cell is received, and the second information for the secondary cell is received, and the first UL reference UL-DL configuration (the serving cell UL-DL configuration) for the primary cell and the first DL reference UL-DL configuration for the secondary cell are different, the corresponding second DL reference UL-DL configuration may be used in two serving cells to specify the correspondence between subframe n in which the PDSCH is arranged and subframe n+k in which the HARQ-ACK corresponding to the PDSCH is transmitted.

When one primary cell and one secondary cell are set, the second information for the primary cell is not received, the second information for the secondary cell is received, and the first UL reference UL-DL configuration (the serving cell UL-DL configuration) for the primary cell and the first DL reference UL-DL for the secondary cell are the same, the corresponding first UL reference UL-DL configuration (the serving cell UL-DL configuration) may be used in the primary cell to specify the correspondence between subframe n in which the PDSCH is arranged and subframe n+k in which the HARQ-ACK corresponding to the PDSCH is transmitted. Further, the corresponding first DL reference UL-DL configuration may be used in the secondary cell to specify correspondence between subframe n in which the PDSCH is arranged and subframe n+k in which the HARQ-ACK corresponding to the PDSCH is transmitted.

When one primary cell and one secondary cell are set, the second information for the primary cell is not received, the second information for the secondary cell is received, the first UL reference UL-DL configuration (the serving cell UL-DL configuration) for the primary cell and the first DL reference UL-DL configuration for the secondary cell are different, the primary cell UL-DL configuration is performed with reference to the first UL reference UL-DL configuration for the primary cell in FIGS. 10 and 12.

Hereinafter, semi-persistent scheduling (SPS) will be described. Here, the transmission on the PUSCH is performed at a timing based on the SFN and the subframe. That is, to specify the timing at which the transmission on the PUSCH is performed, the SFN and the subframe are necessary. Hereinafter, to facilitate the description, the SFN and the subframe in which the transmission on the PUSCH is performed are simply referred to as the subframes. That is, the subframes to be described below include a meaning of the SFN and the subframe.

In the following description of the semi-persistent scheduling, the first UL reference UL-DL configuration and the second UL reference UL-DL configuration are collectively also referred to as the UL reference UL-DL configurations. The first DL reference UL-DL configuration and the second DL reference UL-DL configuration are collectively also referred to as the DL reference UL-DL configurations.

Here, when the first UL reference UL-DL configuration is set and the second UL reference UL-DL configuration is not set, the UL reference UL-DL configuration may be the first UL reference UL-DL configuration. When the first UL reference UL-DL configuration is set and the second UL reference UL-DL configuration is set, the UL reference UL-DL configuration may be set the first UL reference UL-DL configuration. When the first reference UL-DL configuration is set and the second UL reference UL-DL configuration is set, the UL reference UL-DL configuration may be the second UL reference UL-DL configuration.

When the first DL reference UL-DL configuration is set and the second DL reference UL-DL configuration is not set, the DL reference UL-DL configuration may be the first DL reference UL-DL configuration. When the first DL reference UL-DL configuration is set and the second DL reference UL-DL configuration is set, the DL reference UL-DL configuration may be the first DL reference UL-DL configuration. When the first DL reference UL-DL configuration is set and the second DL reference UL-DL configuration is set, the DL reference UL-DL configuration may be the second DL reference UL-DL configuration.

The base station apparatus 3 sets an interval (period) of the semi-persistent scheduling in an uplink in the terminal apparatus 1. For example, the base station apparatus 3 includes a parameter (semiPersistentSchudIntervalUL) for indicating the value of an interval of the semi-persistent scheduling in a signal (RRC message) of a higher layer to transmit the parameter to the terminal apparatus 1.

The base station device 3 can assign the resource (physical resource block) of the semi-persistent (semi-permanent, semi-continuous, or periodic) PUSCH to the terminal apparatus 1 using the DCI format (for example, DCI format 0) for an uplink and can instruct the terminal apparatus 1 to activate the transmission on the semi-persistent PUSCH. The base station apparatus 3 can instruct the terminal apparatus 1 to release (inactivate) the resource of the semi-persistent PUSCH using the DCI format for an uplink.

When the CRC parity bits attached to the DCI format is scrambled by the SPS C-RNTI and the field of the information regarding the new data indicator included in the DCI format is set to '0', the terminal apparatus 1 verifies (confirms or checks) whether the fields of the plurality of pieces of information included in the DCI format are set to specific values.

Here, when the verification is successful, the terminal apparatus 1 considers (recognizes) the received DCI format to indicate a valid semi-persistent activation or a valid semi-persistent release. When the verification is not successful, the terminal apparatus 1 may discard (clear) the DCI format.

The semi-persistent activation may include a meaning of a semi-persistent scheduling activation. The semi-persistent activation may include a meaning of semi-persistent assignment of the resource of the PUSCH. The semi-persistent release may include a meaning of a semi-persistent scheduling release.

That is, the DCI format is used to indicate a semi-persistent uplink scheduling activation. The DCI format is used to validate the semi-persistent scheduling activation. The DCI format is used to indicate the semi-persistent release.

That is, when the CRC parity bits attached to the DCI format is scrambled by the SPS C-RNTI, the field of the information regarding the new data indicator included in the DCI format is set to '0', and the fields of the plurality of pieces of information included in the DCI format are set to specific values (set to specific code points), the terminal apparatus 1 activates (validates) or releases the semi-persistent scheduling based on the DCI format.

That is, when the CRC parity bits attached to the DCI format is scrambled by the SPS C-RNTI, the field of the information regarding the new data indicator included in the DCI format is set to '0', and the fields of the plurality of pieces of information included in the DCI format are set to specific values (set to specific code points), the terminal apparatus 1 considers the received DCI format to be the valid semi-persistent activation or the valid semi-persistent release.

Here, the semi-persistent scheduling may be supported only in the primary cell. That is, when the serving cell is the primary cell, the CRC scrambled by the SPS C-RNTI is attached using the PDCCH in the primary cell, the DCI format for the primary cell is received, and the field of the information regarding the new data indicator included in the DCI format is set to '0', the terminal apparatus 1 may verify whether the semi-persistent activation or the semi-persistent release is indicated.

Here, for example, when the DCI format is used in the semi-persistent activation, the field of the information which is included in the DCI format and information regarding the TPC command for the PUSCH is set to '00', the field of the information regarding a cyclic shift is set to '000', and the most significant bit of the field of the information regarding the MCS and the redundancy version is set to '0'.

When the DCI format is used in the semi-persistent release, the field of the information which is included in the DCI format and is information regarding the TPC command for the PUSCH is set to '00', the field of the information regarding the cyclic shift is set to '000', the field of the information regarding the MCS and the redundancy version is set to '11111' and the fields of the information regarding the resource block assignment and the hopping may be all set to '1'.

When the semi-persistent release is indicated, the terminal apparatus 1 discards (clears) the DCI format set for the semi-persistent scheduling.

When the CRC parity bits attached to the DCI format is scrambled by the SPS C-RNTI and the field of the information regarding the new data indicator included in the DCI format is set to '1', the terminal apparatus 1 considers retransmission on the PUSCH to be indicated and performs the retransmission on the PUSCH based on the DCI format (performs the retransmission on the UL-SCH via the PUSCH).

Here, the combinations of the fields of the information used for the semi-persistent activation and release and the specific values set in the fields of the information are, of course, not limited to the above-described examples. For example, the fields of the information used for the semi-persistent activation and release and the specific values set in the fields of the information can be defined in advance in accordance with a specification or the like and can be set as known information between the base station apparatus 3 and the terminal apparatus 1.

Here, the terminal apparatus 1 has to have a valid uplink grant to perform the transmission on the UL-SCH (transmission on the UL-SCH via the PUSCH). Here, the uplink grant may include a meaning of granting (permitting or allowing) of uplink transmission in a certain subframe.

For example, the valid uplink grant may be dynamically received in the PDCCH. That is, the valid uplink grant may be indicated using the DCI format to which the CRC parity bits scrambled by the C-RNTI is attached.

The valid uplink grant may be set semi-persistently. That is, the valid uplink grant may be indicated using the DCI format to which the CRC parity bits scrambled by the SPS C-RNIT is attached.

That is, when the semi-persistent activation is received, the terminal apparatus 1 stores the DCI format received as a configured uplink grant from the base station apparatus 3. Here, the configured uplink grant may also be referred to as a configured semi-persistent scheduling uplink grant (SPS UL grant) or a configured grant. The configured uplink grant may also be referred to as a configured uplink grant, a configured semi-persistent scheduling uplink grant (SPS UL grant), or a configured grant.

The semi-persistent scheduling uplink grant may also be referred to as an SPS uplink grant, a semi-persistent grant, or a semi-persistent scheduling assignment.

The terminal apparatus 1 initializes or reinitializes the configured uplink grant to start transmission on the PUSCH in a certain subframe and recur the transmission on the PUSCH based on a rule to be described below. Here, the initialization is performed when the semi-persistent scheduling is not active. The reinitialization is performed when the semi-persistent scheduling is already active. Here, the initialization may include a meaning of initial configuration and the reinitialization may include a meaning of initial reconfiguration.

That is, the terminal apparatus 1 starts the transmission on the PUSCH in the certain subframe by initializing or reinitializing the configured uplink grant. Here, the terminal apparatus 1 can specify the certain subframe used to initialize or reinitialize the configured uplink grant based on the subframe in which the UL reference UL-DL configuration and the DCI format (that is, the configured uplink grant) are received.

The base station apparatus 3 may configure a parameter (twoIntervalConfig) used to indicate (trigger) the semi-persistent scheduling (two-intervals-Semi-Persistent Scheduling) at two intervals in an uplink in the terminal apparatus 1.

For example, the parameter (twoIntervalConfig) may be configured only when communication is performed using the TDD scheme. When the field of the parameter (twoIntervalConfig) is present in the RRC message, the semi-persistent scheduling at two intervals is considered to be enabled. When the field of the parameter (twoIntervalConfig) is not present in the RRC message, the semi-persistent scheduling at two intervals is considered to be disabled.

That is, when the semi-persistent scheduling is considered to be valid (for example, when the semi-persistent scheduling is considered to be validated in accordance with the RRC), whether to validate or invalidate the SPS C-RNTI, a parameter (semiPersistSchedIntervalUL), and the parameter (twoIntervalConfig) for an uplink may be supplied at least.

Hereinafter, a rule in which the terminal apparatus 1 starts transmission on the PUSCH in a certain subframe and recurs the transmission on the PUSCH will be described. In the following description, a higher layer is, for example, an RRC layer.

The terminal apparatus 1 sets the SPS uplink grant, subsequently sets a value of Subframe_Offset (subframe offset), and considers (considers sequentially) an Nth grant (the configured uplink grant or the SPS uplink grant) in the subframe specified on the basis of Math. (1) below to occur.

$$(10*SFN+\text{subframe}) = [(10*SFN_{start\_time} + \text{subframe}_{start\_time}) + N*\text{semiPersistSchedInter-valUL} + \text{Subframe\_Offset}*(N \text{ modulo} 2)] \text{ modulo} 10240 \quad [\text{Math. 1}]$$

That is, the terminal apparatus 1 configures the stored DCI format as the SPS uplink grant and subsequently specifies the subframe in which the transmission on the PUSCH corresponding to the Nth configured uplink grant is performed on the basis of Math. (1).

Here, in Math. (1), the SFN and the subframe indicate the SFN and the subframe in which the transmission on the PUSCH is performed.

In Math. (1), SFNstart_time and subframestart_time indicate the SFN and the subframe when the configured uplink grant is initialized or reinitialized. That is, SFNstart_time and subframestart_time indicate the SFN and the subframe (that is, the subframe in which the initial transmission on the PUSCH corresponding to the 0th configured uplink grant is performed) in which the transmission on which the PUSCH starts based on the configured uplink grant.

In Math. (1), Subframe_Offset (subframe offset) indicates the value of the offset used to specify the subframe in which the transmission on the PUSCH is performed.

Here, after the SPS uplink grant is configured and when the parameter (twoIntervalConfig) is not validated in accordance with a higher layer, the terminal apparatus 1 sets Subframe_Offset in Math. (1) to '0'.

FIG. 16 is a diagram illustrating examples of values of Subframe_Offset. As described above, after the SPS uplink grant is set and when the parameter (twoIntervalConfig) is validated in accordance with the higher layer, the terminal apparatus 1 sets Subframe_Offset in Math. (1) on the basis of the table of FIG. 16.

As illustrated in FIG. 16, for example, when UL-DL configuration 1 is set and the position of the subframe (the position of an initial SPS UL grant) in which the initial transmission on the PUSCH corresponding to the 0th configured uplink grant is performed is subframe 2, 1 ms is set as the value of Subframe_Offset. Here, the position of the initial SPS UL grant in FIG. 16 corresponds to the subframe in which the transmission on the PUSCH starts.

Here, the base station apparatus 3 and the terminal apparatus 1 may consider the UL-DL configuration in the table of FIG. 16 to be the DL reference UL-DL configuration and set the value of Subframe_Offset. That is, the base station apparatus 3 and the terminal apparatus 1 may set the value of Subframe_Offset based on the DL reference UL-DL configuration and specify the subframe in which the transmission on the semi-persistent PUSCH is performed on the basis of Math. (1).

That is, when the parameter (twoIntervalConfig) is validated in accordance with the higher layer and the DL reference UL-DL configuration is set, the base station apparatus 3 and the terminal apparatus 1 may set the value of Subframe_Offset based on the DL reference UL-DL configuration and specify the subframe in which the transmission on the semi-persistent PUSCH is performed on the basis of Math. (1).

When the parameter (twoIntervalConfig) is validated in accordance with the higher layer and the DL reference UL-DL configuration is not set, the base station apparatus 3 and the terminal apparatus 1 may set the value of Subframe_Offset based on the DL reference UL-DL configuration by considering the UL-DL configuration in the table of FIG. 16 to be the UL reference UL-DL configuration and may specify the subframe in which the transmission on the semi-persistent PUSCH is performed on the basis of Math. (1).

That is, when the parameter (twoIntervalConfig) is validated in accordance with the higher layer and the DL reference UL-DL configuration is not set, the base station apparatus 3 and the terminal apparatus 1 may set the value of Subframe_Offset based on the UL reference UL-DL configuration and may specify the subframe in which the transmission on the semi-persistent PUSCH is performed on the basis of Math. (1).

When the UL reference UL-DL configuration is set to a specific value, the base station apparatus 3 and the terminal apparatus 1 may consider the UL-DL configuration in the table of FIG. 16 to be the UL reference UL-DL configuration and may set the value of Subframe_Offset.

That is, when UL reference UL-DL configuration is set to the specific value, the base station apparatus 3 and the terminal apparatus 1 may set the value of Subframe_Offset based on the UL reference UL-DL configuration and may specify the subframe in which the transmission on the semi-persistent PUSCH is performed on the basis of Math. (1).

That is, when the parameter (twoIntervalConfig) is validated in accordance with the higher layer, the DL reference UL-DL configuration is set, and the UL reference UL-DL configuration is set to a specific value, the base station apparatus 3 and the terminal apparatus 1 may set the value of Subframe_Offset based on the UL reference UL-DL configuration and may specify the subframe in which the transmission on the semi-persistent PUSCH is performed on the basis of Math. (1).

When the UL reference UL-DL configuration is set to a value other than the specific value, the base station apparatus 3 and the terminal apparatus 1 may consider the UL-DL configuration in the table of FIG. 16 to be the DL reference UL-DL configuration and may set the value of Subframe_Offset.

That is, when the UL reference UL-DL configuration is set to a value other the specific value, the base station apparatus 3 and the terminal apparatus 1 may set the value of Subframe_Offset based on the DL reference UL-DL configuration and may specify the subframe in which the transmission on the semi-persistent PUSCH is performed on the basis of Math. (1).

That is, when the parameter (twoIntervalConfig) is validated in accordance with the higher layer, the DL reference UL-DL configuration is set, and the UL reference UL-DL configuration is set to a value other than the specific value, the base station apparatus 3 and the terminal apparatus 1 may set the value of Subframe_Offset based on the DL reference UL-DL configuration and may specify the subframe in which the transmission on the semi-persistent PUSCH is performed on the basis of Math. (1).

Here, for example, the specific value set in the UL reference UL-DL configuration may be {0, 5, 6}. The value other than the specific value set in the UL reference UL-DL configuration may be {1, 2, 3, 4}. Here, the specific value set in the UL reference UL-DL configuration and/or the value other than the specific value may be other values. For example, the specific value and the value other than the specific value set in the UL reference UL-DL configuration can be defined in advance in accordance with a specification or the like and can be set as known information between the base station apparatus 3 and the terminal apparatus 1.

Figure 17:
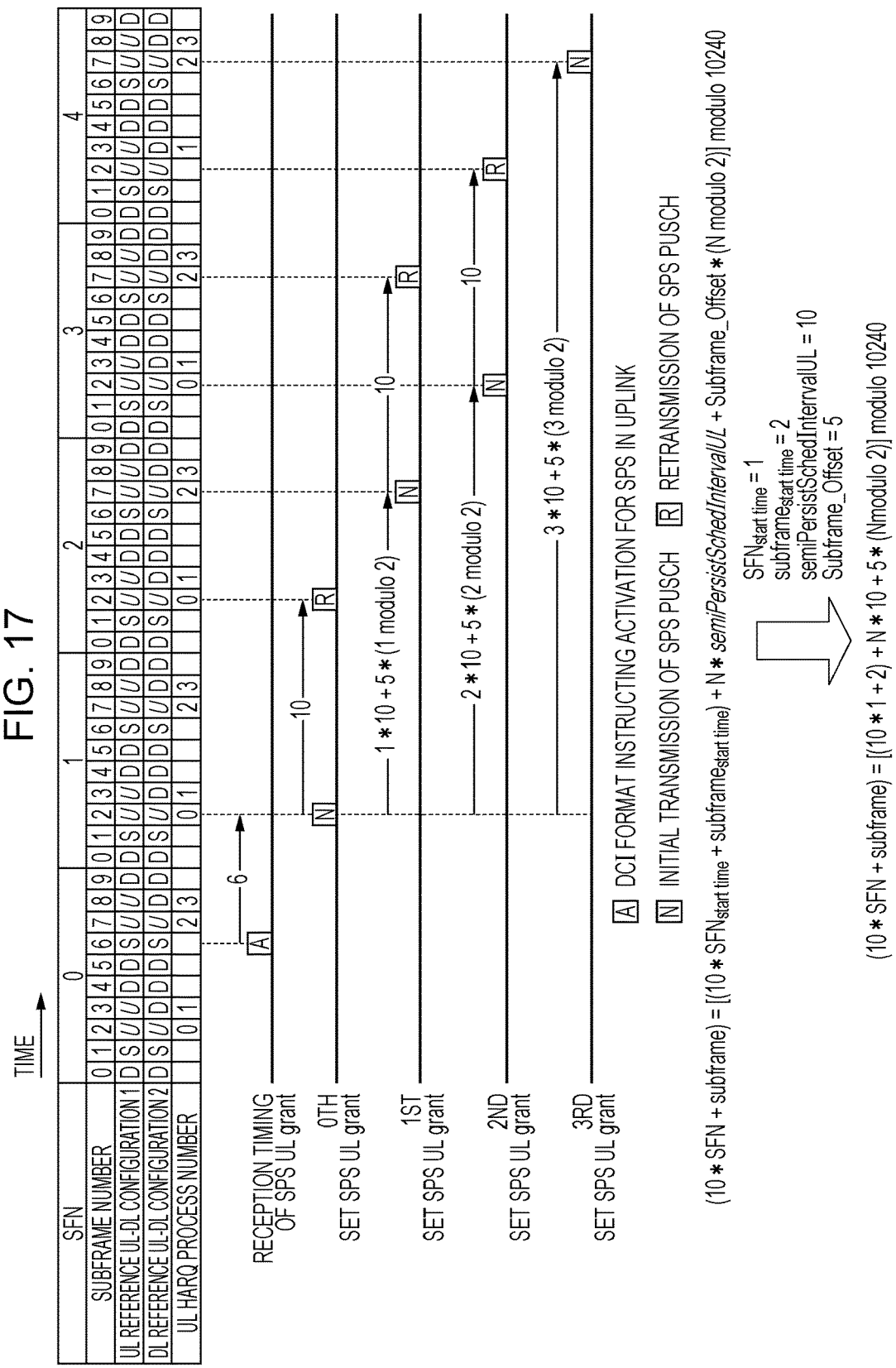
FIG. 17 is a diagram illustrating a method of transmitting uplink data.

FIG. 17 is a diagram illustrating a method of transmitting uplink data according to the embodiment. Here, for example, FIG. 17 illustrates a case in which UL reference UL-DL configuration 1 and DL reference UL-DL configuration 2 are set. A case in which 10 ms is set as the value of the interval of the semi-persistent scheduling is illustrated.

In FIG. 17, the terminal apparatus 1 performs the initial transmission on the PUSCH corresponding to the 0th configured uplink grant is transmitted [SFN=1, subframe 2]. That is, in FIG. 17, SFNstart_time is 1 and subframestart_time is 2.

In FIG. 17, since the UL reference UL-DL configuration belongs to the value {1, 2, 3, 4} other than the specific value, the value of Subframe_Offset is set based on the DL reference UL-DL configuration. That is, in FIG. 17, 5 is set as the value of Subframe_Offset in accordance with columns of UL-DL configuration 2 and subframe 2 in the table of FIG. 16.

In FIG. 17, a UL HARQ process number corresponding to each transmission is illustrated. Here, the number of UL HARQ processes is specified based on the UL reference UL-DL configuration. For example, in the case of UL reference UL-DL configuration 1, the number of UL HARQ processes is 4.

In FIG. 17, the terminal apparatus 1 receiving the DCI format indicating the semi-persistent activation in [SFN=0, subframe 6] stores the received DCI format as the configured uplink grant and performs the initial transmission on the PUSCH corresponding to the 0th configured uplink grant.

As described above, the subframe (the subframe in which the transmission on the PUSCH starts) in which the initial transmission on the PUSCH corresponding to the 0th configured uplink grant is performed is specified based on the UL reference UL-DL configuration and the subframe in which the DCI format (the configured uplink grant) is received.

That is, UL reference UL-DL configuration 1 is set, and the terminal apparatus 1 receiving the DCI format in [SFN=0, subframe 6] specifies the subframe (that is, [SFN=1, subframe 2]) located later by 6 subframes in accordance with the table of FIG. 13. The terminal apparatus 1 performs the initial transmission on the PUSCH corresponding to the 0th configured uplink grant in the specified [SFN=1, subframe 2].

The terminal apparatus 1 specifies [SFN=2, subframe 2] as the subframe in which the retransmission on the PUSCH corresponding to the 0th configured uplink grant is performed based on the UL reference UL-DL configuration and the subframe in which the transmission on the PUSCH is performed.

That is, UL reference UL-DL configuration 1 is set, and the terminal apparatus 1 performing the transmission on the PUSCH corresponding to the 0th configured uplink grant in [SFN=1, subframe 2] receives the HARQ-ACK in the corresponding PHICH in the subframe located later by 4 subframes (that is, [SFN=1, subframe 6]) on the basis of the table of FIG. 14.

UL reference UL-DL configuration 1 is set, and the terminal apparatus 1 receiving the NACK in the corresponding PHICH in [SFN=1, subframe 6] specifies the subframe located later by 6 subframes (that is, [SFN=2, subframe 2]) as the subframe in which the retransmission on the PUSCH corresponding to the 0th configured uplink grant is performed on the basis of the table of FIG. 13. The terminal apparatus 1 performs the retransmission on the PUSCH corresponding to the 0th configured uplink grant in the specified [SFN=2, subframe 2].

Since the process in which the terminal apparatus 1 specifies the subframe in which the retransmission on the PUSCH is performed is the same, the description thereof will be omitted below.

Here, as illustrated in FIG. 17, the UL HARQ process number corresponding to the initial transmission on the PUSCH corresponding to the 0th configured uplink grant is '0'. The UL HARQ process number corresponding to the retransmission on the PUSCH corresponding to the 0th configured uplink grant is performed is '0'.

The terminal apparatus 1 specifies [SFN=2, subframe 7] in regard to the initial transmission on the PUSCH corresponding to the 1st configured uplink grant on the basis of Math. (1). The terminal apparatus 1 performs the initial transmission on the PUSCH corresponding to the 1st configured uplink grant in the specified [SFN=2, subframe 7].

Here, as illustrated in FIG. 17, the UL HARQ process number corresponding to the initial transmission on the PUSCH corresponding to the 1st configured uplink grant is '2'. The UL HARQ process number corresponding to the retransmission on the PUSCH corresponding to the 1st configured uplink grant is '2'.

The terminal apparatus 1 specifies [SFN=3, subframe 2] in the initial transmission on the PUSCH corresponding to the 2nd configured uplink grant on the basis of Math. (1). The terminal apparatus 1 performs the initial transmission on the PUSCH corresponding to the 2nd configured uplink grant in the specified [SFN=3, subframe 2].

Here, as illustrated in FIG. 17, the UL HARQ process number corresponding to the initial transmission on the PUSCH corresponding to the 2nd configured uplink grant is '0'. The UL HARQ process number corresponding to the retransmission on the PUSCH corresponding the 2nd configured uplink grant is '0'.

The terminal apparatus 1 specifies [SFN=4, subframe 7] in regard to the initial transmission on the PUSCH corresponding to the 3rd configured uplink grant on the basis of Math. (1). The terminal apparatus 1 performs the initial transmission on the PUSCH corresponding to the 3rd configured uplink grant in the specified [SFN=4, subframe 7].

Here, as illustrated in FIG. 17, the UL HARQ process number corresponding to the initial transmission on the PUSCH corresponding to the 3rd configured uplink grant is '2'. Although not illustrated, the UL HARQ process number corresponding to the retransmission on the PUSCH corresponding to the 3rd configured uplink grant is '2'.

Thereafter, the terminal apparatus 1 sets the value of Subframe_Offset based on the DL reference UL-DL configuration in regard to the initial transmission on the PUSCH corresponding to an Nth configured uplink grant and specifies the subframe in which the transmission on the PUSCH is performed on the basis of Math. (1). The terminal apparatus 1 performs the initial transmission on the PUSCH corresponding to the Nth configured uplink grant in the specified subframe.

Accordingly, in an even-number configured uplink grant and an odd-number configured uplink grant, an opportunity of the retransmission on the PUSCH corresponding to the Nth configured uplink grant can be increased to correspond to different-number UL HARQ processes.

Here, when UL reference UL-DL configuration 1 is used to specify Subframe_offset in FIG. 17, 1 is set in Subframe-offset. In this case, the transmission on the PUSCH corresponding to an odd-number configured uplink grant may occur in the flexible subframe [SFN=X, subframe 2]. Accordingly, as illustrated in FIG. 17, when the UL reference UL-DL configuration belongs to the value {1, 2, 3, 4} other than the specific value, the DL reference UL-DL configuration is preferably used to specify Subframe_offset.

Figure 18:
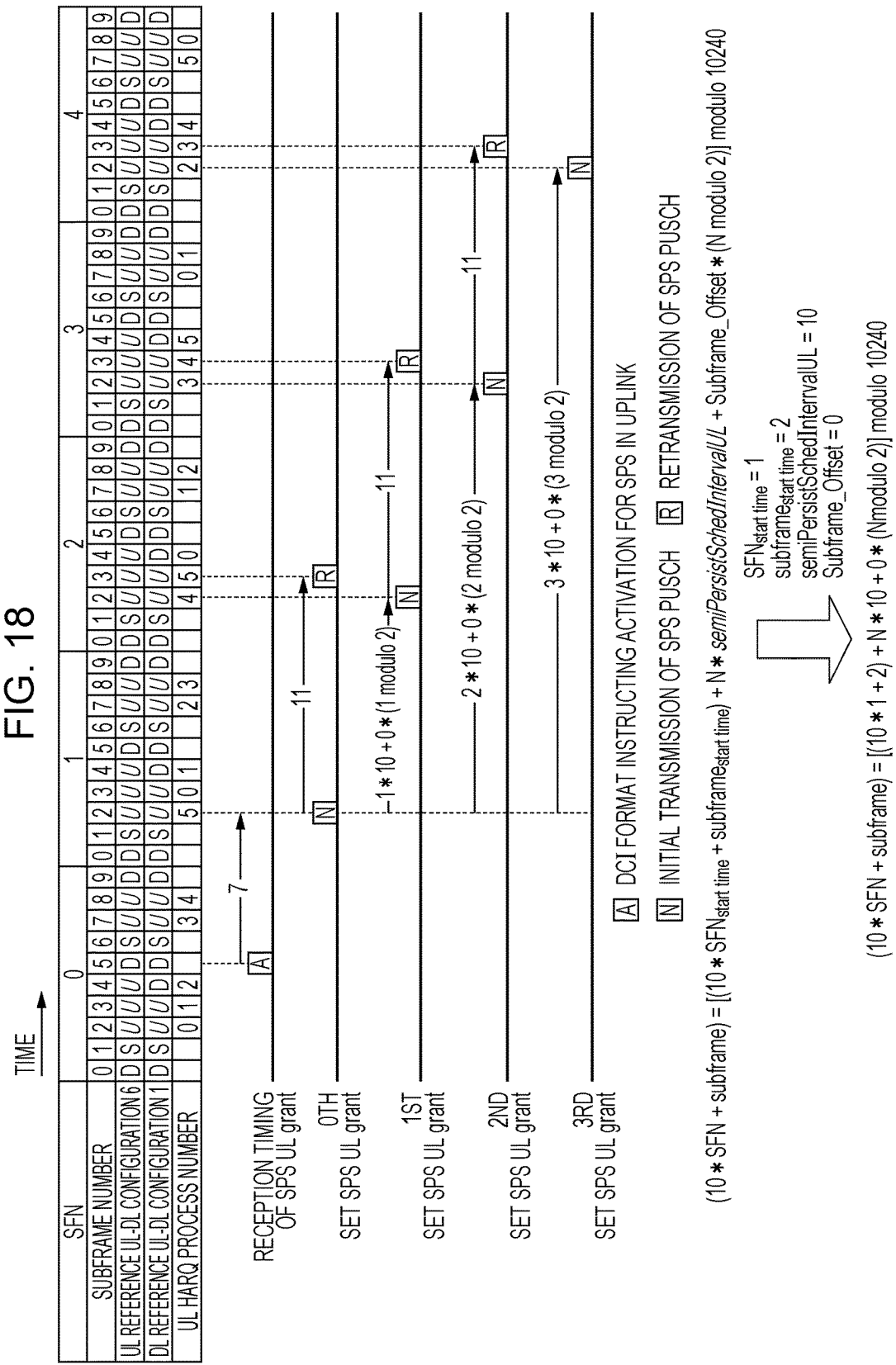
FIG. 18 is a diagram illustrating a method of transmitting uplink data.

FIG. 18 is another diagram illustrating a method of transmitting uplink data according to the embodiment. Here, for example, FIG. 18 illustrates a case in which UL reference UL-DL configuration 6 and DL reference UL-DL configuration 1 are set. A case in which 10 ms is set as the value of the interval of the semi-persistent scheduling is illustrated.

In FIG. 18, the terminal apparatus 1 performs the initial transmission on the PUSCH corresponding to the 0th configured uplink grant is transmitted [SFN=1, subframe 2]. That is, in FIG. 18, SFNstart_time is 1 and subframestart_time is 2.

In FIG. 18, since the UL reference UL-DL configuration belongs to the specific value {0, 5, 6}, the value of Subframe_Offset is set based on the UL reference UL-DL configuration. That is, in FIG. 18, 0 is set as the value of Subframe_Offset in accordance with column of UL-DL configuration 6 in the table of FIG. 16.

In FIG. 18, a UL HARQ process number corresponding to each transmission is illustrated. Here, the number of UL HARQ processes is specified based on the UL reference UL-DL configuration. For example, in the case of UL reference UL-DL configuration 6, the number of UL HARQ processes is 6.

In FIG. 18, the terminal apparatus 1 receiving the DCI format indicating the semi-persistent activation in [SFN=0, subframe 5] stores the received DCI format as the configured uplink grant and performs the initial transmission on the PUSCH corresponding to the 0th configured uplink grant.

As described above, the subframe (the subframe in which the transmission on the PUSCH starts) in which the initial transmission on the PUSCH corresponding to the 0th configured uplink grant is performed is specified based on the UL reference UL-DL configuration and the subframe in which the DCI format (the configured uplink grant) is received.

That is, UL reference UL-DL configuration 6 is set, and the terminal apparatus 1 receiving the DCI format in [SFN=0, subframe 5] specifies the subframe (that is, [SFN=1, subframe 2]) located later by 7 subframes in accordance with the table of FIG. 13. The terminal apparatus 1 performs the initial transmission on the PUSCH corresponding to the 0th configured uplink grant in the specified [SFN=1, subframe 2].

The terminal apparatus 1 specifies [SFN=2, subframe 3] as the subframe in which the retransmission on the PUSCH corresponding to the 0th configured uplink grant is performed based on the UL reference UL-DL configuration and the subframe in which the transmission on the PUSCH is performed.

Here, as illustrated in FIG. 18, the UL HARQ process number corresponding to the initial transmission on the PUSCH corresponding to the 0th configured uplink grant is '5'. The UL HARQ process number corresponding to the retransmission on the PUSCH corresponding to the 0th configured uplink grant is performed is '5'.

The terminal apparatus 1 specifies [SFN=2, subframe 2] in regard to the initial transmission on the PUSCH corresponding to the 1st configured uplink grant on the basis of Math. (1). The terminal apparatus 1 performs the initial transmission on the PUSCH corresponding to the 1st configured uplink grant in the specified [SFN=2, subframe 2].

Here, as illustrated in FIG. 18, the UL HARQ process number corresponding to the initial transmission on the PUSCH corresponding to the 1st configured uplink grant is '4'. The UL HARQ process number corresponding to the retransmission on the PUSCH corresponding to the 1st configured uplink grant is '4'.

The terminal apparatus 1 specifies [SFN=3, subframe 2]. (1) in the initial transmission on the PUSCH corresponding to the 2nd configured uplink grant on the basis of Math. The terminal apparatus 1 performs the initial transmission on the PUSCH corresponding to the 2nd configured uplink grant in the specified [SFN=3, subframe 2].

Here, as illustrated in FIG. 18, the UL HARQ process number corresponding to the initial transmission on the PUSCH corresponding to the 2nd configured uplink grant is '3'. The UL HARQ process number corresponding to the retransmission on the PUSCH corresponding the 1st configured uplink grant is '3'.

The terminal apparatus 1 specifies [SFN=4, subframe 2] in regard to the initial transmission on the PUSCH corresponding to the 3rd configured uplink grant on the basis of Math. (1). The terminal apparatus 1 performs the initial transmission on the PUSCH corresponding to the 3rd configured uplink grant in the specified [SFN=4, subframe 2].

Here, as illustrated in FIG. 18, the UL HARQ process number corresponding to the initial transmission on the PUSCH corresponding to the 3rd configured uplink grant is '2'. Although not illustrated, the UL HARQ process number corresponding to the retransmission on the PUSCH corresponding to the 3rd configured uplink grant is '2'.

Thereafter, the terminal apparatus 1 sets the value of Subframe_Offset based on the UL reference UL-DL configuration in regard to the initial transmission on the PUSCH corresponding to an Nth configured uplink grant and specifies the subframe in which the transmission on the PUSCH is performed on the basis of Math. (1). The terminal apparatus 1 performs the initial transmission on the PUSCH corresponding to the Nth configured uplink grant in the specified subframe.

Here, when the UL reference UL-DL configuration belongs to {5}, only one uplink subframe is included in one radio frame. That is, when the UL reference UL-DL configuration belongs to {5}, the value of Subframe_Offset may not be set to a value except for 0 based on the DL reference UL-DL configuration.

Here, as illustrated in FIG. 18, when the UL reference UL-DL configuration belongs to {0, 6}, the configured uplink grants of continuous numbers correspond to the HARQ processes of different numbers. That is, when the UL reference UL-DL configuration belongs to {0, 6}, it is not necessary to set the value of Subframe_Offset to a value except for 0 based on the DL reference UL-DL configuration.

Here, when DL reference UL-DL configuration 1 is used to specify Subframe_offset in FIG. 18, 1 is set in Subframe-offset. In this case, the transmission on the PUSCH corresponding to an odd-number configured uplink grant may occur in the flexible subframe [SFN=X, subframe 2]. Accordingly, as illustrated in FIG. 18, when the UL reference UL-DL configuration belongs to the specific value {0, 5, 6}, the UL reference UL-DL configuration is preferably used to specify Subframe_offset.

Here, the base station apparatus 3 may notify the terminal apparatus 1 of the number of UL HARQ processes. Even when the base station apparatus 3 notifies the terminal apparatus 1 of the number of UL HARQ process so that a certain UL reference UL-DL configuration is set, the base station apparatus 3 may instruct the terminal apparatus 1 to use the number of UL HARQ processes. When the terminal apparatus 1 is notified of the number of UL HARQ processes, the terminal apparatus 1 may use the notified number of UL HARQ process irrespective of the UL reference UL-DL configuration.

For example, the base station apparatus 3 may include fourth information (parameter) indicating the number of UL HARQ processes in at least one of the MIB, the system information block type 1 message, the system information message, the RRC message, the MAC CE (Control Element), and the control information (for example, the DCI format) of the physical layer to transmit the fourth information to the terminal apparatus 1.

Preferably, the base station apparatus 3 may include a parameter indicating the number of UL HARQ processes in either of the system information message and the RRC message (which may be a dedicated message) to transmit the parameter to the terminal apparatus 1.

In this way, by notifying the terminal apparatus 1 of the number of UL HARQ processes, the base station apparatus 3 and the terminal apparatus 1 can perform the process related to the UL HARQ processes more efficiently.

The operation of the terminal apparatus 1 has been basically described above. However, an operation corresponding to the operation of the terminal apparatus 1 is, of course, performed by the base station apparatus 3. The base station apparatus 3 and the terminal apparatus 1 may, of course, be combined to operate the above-described method of transmitting the uplink data.

The structures of the apparatuses according to the embodiment will be described.

Figure 19:
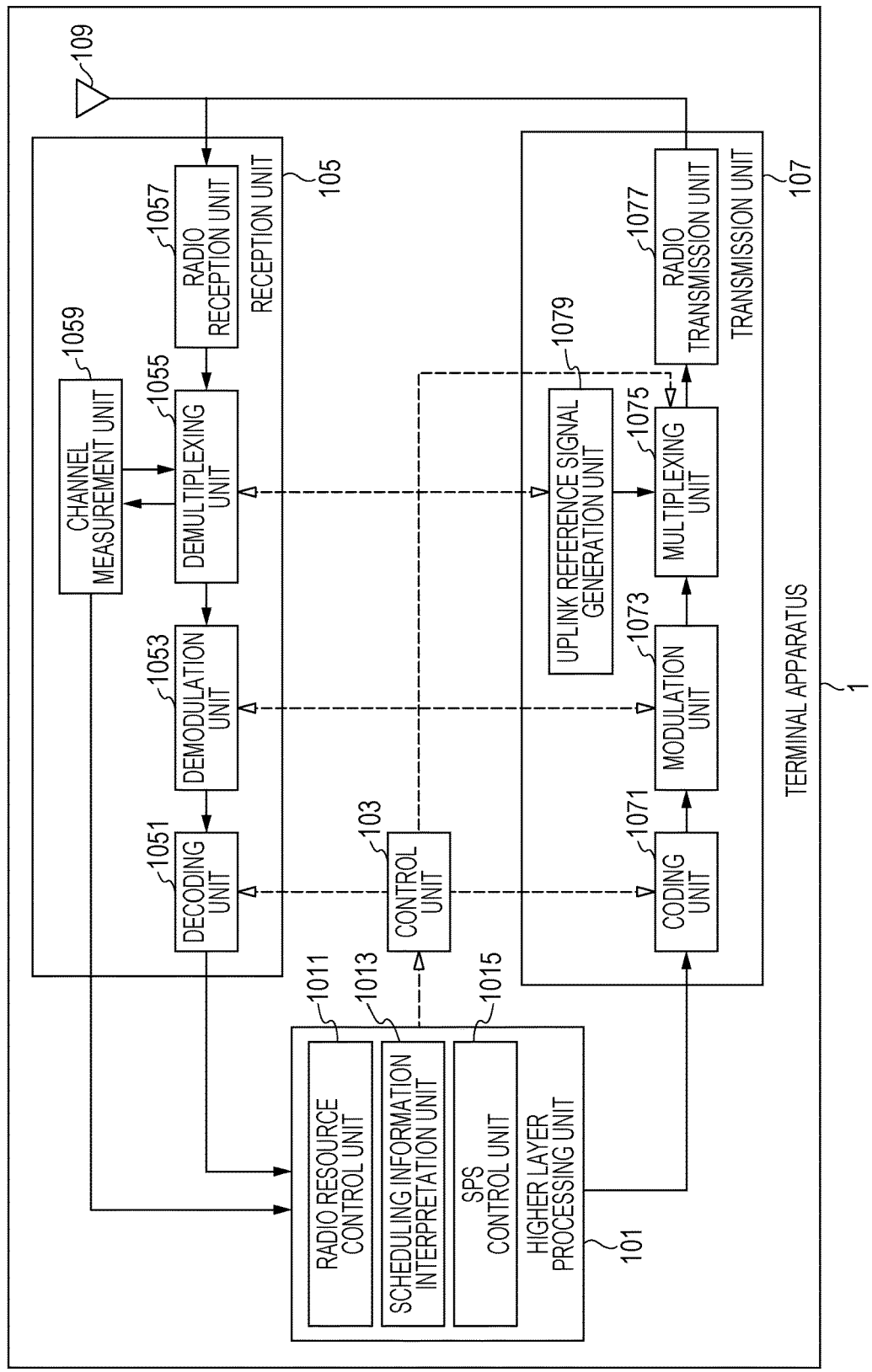
FIG. 19 is a schematic block diagram illustrating the structure of a terminal apparatus 1.

FIG. 19 is a schematic block diagram illustrating the structure of the terminal apparatus 1 according to the embodiment. As illustrated, the terminal apparatus 1 includes a higher layer processing unit 101, a control unit 103, a reception unit 105, a transmission unit 107, and a transmission/reception antenna 109. The higher layer processing unit 101 includes a radio resource control unit 1011, a scheduling information interpretation unit 1013, and an SPS control unit 1015. The reception unit 105 includes a decoding unit 1051, a demodulation unit 1053, a demultiplexing unit 1055, a radio reception unit 1057, and a channel measurement unit 1059. The transmission unit 107 includes a coding unit 1071, a modulation unit 1073, a multiplexing unit 1075, a radio transmission unit 1077, and an uplink reference signal generation unit 1079.

The higher layer processing unit 101 outputs the uplink data (transport block) generated through a user's operation or the like to the transmission unit 107. The higher layer processing unit 101 performs processes for a medium access control (MAC) layer, a packet data convergence protocol (PDCP) layer, a radio link control (RLC) layer, and a radio resource control (RRC) layer.

The radio resource control unit 1011 included in the higher layer processing unit 101 manages various kinds of configuration information/parameters of the terminal apparatus. The radio resource control unit 1011 sets various kinds of configuration information/parameters based on signals of the higher layer received from the base station apparatus 3. That is, the radio resource control unit 1011 sets various kinds of configuration information/parameters based on information indicating the various kinds of configuration information/parameters received from the base station apparatus 3. The radio resource control unit 1011 generates information arranged in each uplink channel and outputs the information to the transmission unit 107. The radio resource control unit 1011 is also referred to as the configuration unit 1011.

The scheduling information interpretation unit 1013 included in the higher layer processing unit 101 interprets the DCI format (scheduling information) received via the reception unit 105, generates control information to control the reception unit 105 and the transmission unit 107 based on the analysis result of the DCI format, and outputs the control information to the control unit 103.

The SPS control unit 1015 included in the higher layer processing unit 101 controls the semi-persistent scheduling based on configuration/information/parameter related to the semi-persistent scheduling managed by the radio resource control unit 1011.

The control unit 103 generates control signals used to control the reception unit 105 and the transmission unit 107 based on the control information from the higher layer processing unit 101. The control unit 103 outputs the generated control signals to the reception unit 105 and the transmission unit 107 to control the reception unit 105 and the transmission unit 107.

The reception unit 105 separates, demodulates, and decodes a received signal received from the base station apparatus 3 via the transmission/reception antenna 109 according to the control signal input from the control unit 103 and outputs decoded information to the higher layer processing unit 101.

The radio reception unit 1057 converts (downconverts) a downlink signal received via the transmission/reception antenna 109 into a baseband signal through quadrature demodulation, removes an unnecessary frequency component, controls an amplification level so that the signal level is appropriately maintained, performs the quadrature demodulation based on an in-phase component and a quadrature component of the received signal, and converts the analog signal subjected to the quadrature demodulation into a digital signal. The radio reception unit 1057 removes a portion corresponding to the CP (cyclic prefix) from the converted digital signal and performs fast Fourier transform (FFT) on the signal from which the CP is removed to extract a signal of the frequency region.

The demultiplexing unit 1055 separates the extracted signal into the PHICH, the PDCCH, the EPDCCH, the PDSCH, and the downlink reference signal. The demultiplexing unit 1055 compensates for channels of the PHICH, the PDCCH, the EPDCCH, and the PDSCH from estimated values of the channels input from the channel measurement unit 1059. The demultiplexing unit 1055 outputs the separated downlink reference signal to the channel measurement unit 1059.

The demodulation unit 1053 multiplies a corresponding code to the PHICH to combine the code, demodulates the combined signal according to the BPSK (binary phase shift keying) modulation scheme, and outputs the demodulated signal to the decoding unit 1051. The decoding unit 1051 decodes the PHICH for the terminal apparatus and outputs the decoded HARQ indicator to the higher layer processing unit 101. The demodulation unit 1053 demodulates the PDCCH and/or the EPDCCH according to the QPSK demodulation scheme and outputs the demodulated signal to the decoding unit 1051. The decoding unit 1051 attempts to decode the PDCCH and/or the EPDCCH. When the decoding unit 1051 succeeds in the decoding, the decoding unit 1051 outputs decoded downlink control information and the RNTI corresponding to the downlink control information to the higher layer processing unit 101.

The demodulation unit 1053 performs demodulation on the PDSCH according to a demodulation scheme notified of with the downlink grant, such as the QPSK (quadrature phase shift keying), 16 QAM (quadrature amplitude modulation), or 64 QAM and outputs the demodulated result to the decoding unit 1051. The decoding unit 1051 performs decoding based on information regarding the encoding ratio notified of with the downlink control information and outputs the decoded downlink data (transport block) to the higher layer processing unit 101.

The channel measurement unit 1059 measures a path loss or a channel state of the downlink from the downlink reference signal input from the demultiplexing unit 1055 and outputs the measured path loss or channel state to the higher layer processing unit 101. The channel measurement unit 1059 calculates an estimated value of the downlink channel from the downlink reference signal and outputs the estimated value to the demultiplexing unit 1055. The channel measurement unit 1059 performs channel measurement and/or interference measurement to calculate the CQI.

The transmission unit 107 generates an uplink reference signal according to the control signal input from the control unit 103, codes and modulates the uplink data (transport block) input from the higher layer processing unit 101, multiplexes the PUCCH, the PUSCH, and the generated uplink reference signal, and transmits the multiplexed PUCCH, PUSCH, and uplink reference signal to the base station apparatus 3 via the transmission/reception antenna 109.

The coding unit 1071 performs coding such as convolutional coding or block coding on the uplink control information input from the higher layer processing unit 101. The coding unit 1071 performs turbo coding based on information used to schedule the PUSCH.

The modulation unit 1073 modulates the coded bits input from the coding unit 1071 according to a modulation scheme notified of with the downlink control information, such as the BPSK, the QPSK, the 16 QAM, or the 64 QAM or a modulation scheme determined in advance for each channel. The modulation unit 1073 determines the number of series of spatially multiplexed data based on the information used for the scheduling of the PUSCH, maps the plurality of pieces of uplink data transmitted with the same PUSCH to the plurality of series by using MIMO (multiple input multiple output) SM (Spatial Multiplexing), and performs precoding on the series.

The uplink reference signal generation unit 1079 generates a series obtained by a rule (expression) determined in advance based on a physical cell identity (PCI: referred to as a Cell ID or the like) for identifying the base station apparatus 3, a bandwidth in which the uplink reference signal is arranged, a cyclic shift notified of with the uplink grant, the values of parameters for generation of a DMRS sequence, and the like. The multiplexing unit 1075 sorts the modulation symbols of the PUSCH in parallel according to the control signal input from the control unit 103, and then performs discrete Fourier transform (DFT). The multiplexing unit 1075 multiplexes the signals of the PUCCH and the PUSCH and the generated uplink reference signal for each transmission antenna port. That is, the multiplexing unit 1075 arranges the signals of the PUCCH and the PUSCH and the generated uplink reference signal in the resource element for each transmission antenna port.

The radio transmission unit 1077 performs inverse fast Fourier transform (IFFT) on the multiplexed signals, generates the SC-FDMA symbols, adds the CP to the generated SC-FDMA symbols, generates a baseband digital signal, converts the baseband digital signal into an analog signal, removes an excessive frequency component using a lowpass filter, performs upconverting on a carrier frequency, performs power amplification, and outputs the signal to the transmission/reception antenna 109 to transmit the signal.

Figure 20:
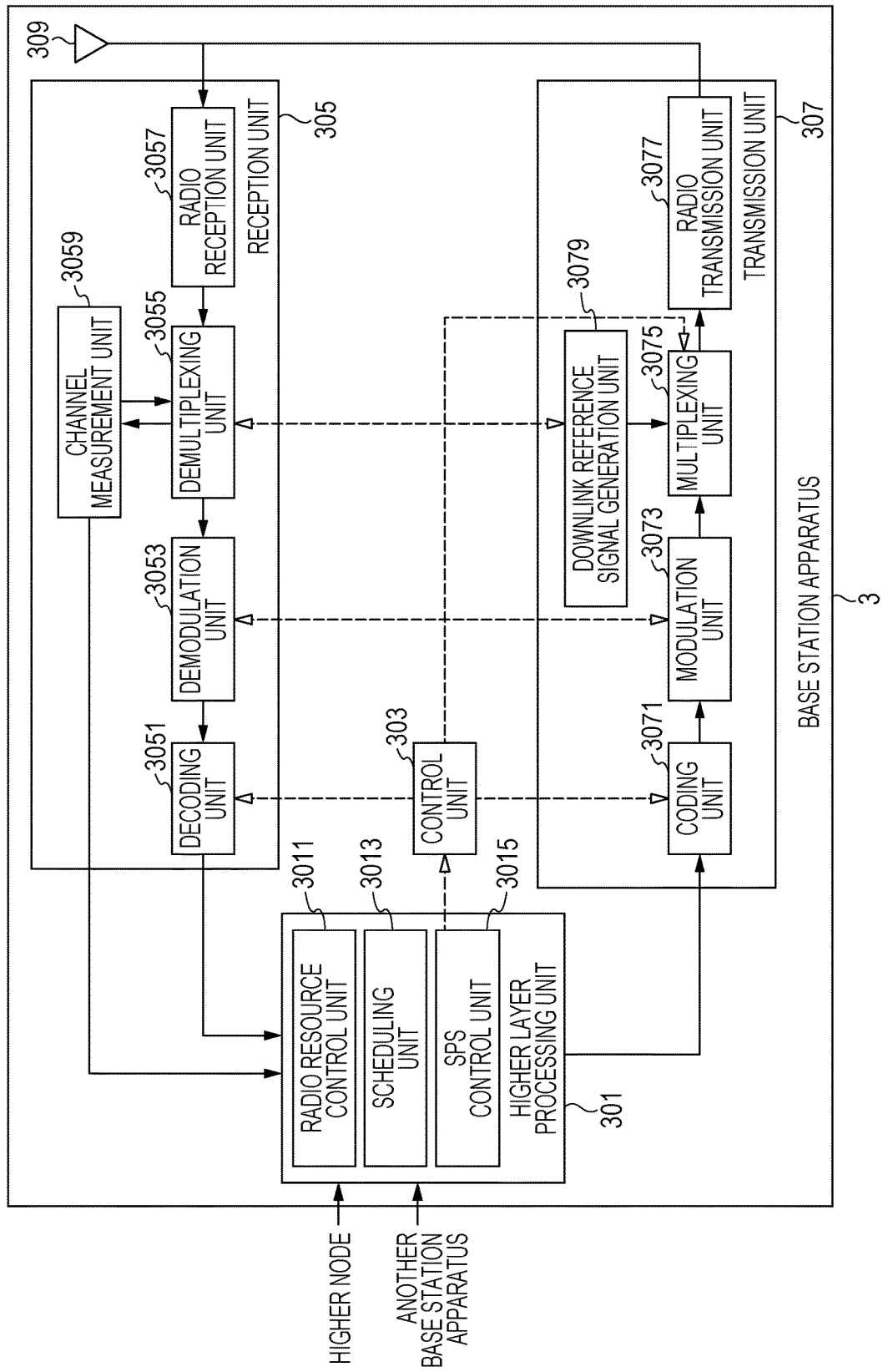
FIG. 20 is a schematic block diagram illustrating the structure of a base station apparatus 3.

FIG. 20 is a schematic block diagram illustrating the structure of a base station apparatus 3 according to the embodiment. As illustrated, the base station apparatus 3 includes a higher layer processing unit 301, a control unit 303, a reception unit 305, a transmission unit 307, and a transmission/reception antenna 309. The higher layer processing unit 301 includes a radio resource control unit 3011, a scheduling unit 3013, an SPS control unit 3015. The reception unit 305 includes a decoding unit 3051, a demodulation unit 3053, a demultiplexing unit 3055, a radio reception unit 3057, and a channel measurement unit 3059. The transmission unit 307 includes a coding unit 3071, a modulation unit 3073, a multiplexing unit 3075, a radio transmission unit 3077, and a downlink reference signal generation unit 3079.

The higher layer processing unit 301 performs processes for a medium access control (MAC) layer, a packet data convergence protocol (PDCP) layer, a radio link control (RLC) layer, and a radio resource control (RRC) layer. The higher layer processing unit 301 generates control information to control the reception unit 305 and the transmission unit 307 and outputs the control information to the control unit 303.

The radio resource control unit 3011 included in the higher layer processing unit 301 generates the downlink data (transport block) arranged in the downlink PDSCH, the system information, the RRC message, the MAC CE (Control Element), and the like or acquires the downlink data, the downlink PDSCH, the system information, the RRC message, the MAC CE, and the like from a higher node, and then outputs the downlink data, the downlink PDSCH, the system information, the RRC message, the MAC CE, and the like to the transmission unit 307. The radio resource control unit 3011 manages various kinds of configuration information/parameters of each terminal apparatus 1. The radio resource control unit 3011 may set various kinds of configuration information/parameters in the terminal apparatus 1 via the signals of the higher layer. That is, the radio resource control unit 1011 transmits/reports information indicating the various kinds of configuration information/parameters. The radio resource control unit 3011 is also referred to as the configuration unit 3011.

The scheduling unit 3013 included in the higher layer processing unit 301 determines the frequencies and the subframes for allocating the physical channels (the PDSCH and the PUSCH) and the coding rate, modulation scheme, transmission power, and the like of the physical channels (the PDSCH and the PUSCH) for allocating the physical channels (the PDSCH and the PUSCH) from the received channel state information, the estimated value of the channel or the channel quality input from the channel measurement unit 3059, and the like. The scheduling unit 3013 generates control information (for example, the DCI format) to control the reception unit 305 and the transmission unit 307 based on the scheduling result and outputs the control information to the control unit 303. The scheduling unit 3013 decides timings at which the transmission process and the reception process are performed.

The SPS control unit 3015 included in the higher layer processing unit 301 controls the transmission on the PUSCH based on the semi-persistent scheduling by the terminal apparatus 1 via the configuration/information/parameter related to the semi-persistent scheduling managed by the radio resource control unit 3011.

Based on the control information from the higher layer processing unit 301, the control unit 303 generates the control signal to control the reception unit 305 and the transmission unit 307. The control unit 303 outputs the generated control signal to the reception unit 305 and the transmission unit 307 to control the reception unit 305 and the transmission unit 307.

The reception unit 305 separates, demodulates, and decodes the received signal received from the terminal apparatus 1 via the transmission/reception antenna 309 according to the control signal input from the control unit 303 and outputs the decoded information to the higher layer processing unit 301. The radio reception unit 3057 converts (downconverts) the uplink signal received via the transmission/reception antenna 309 into a baseband signal through quadrature demodulation, removes an unnecessary frequency component, controls an amplification level so the signal level is appropriately maintained, performs the quadrature demodulation based on an in-phase component and a quadrature component of the received signal, and converts the analog signal subjected to the quadrature demodulation into a digital signal.

The radio reception unit 3057 removes a portion corresponding to the CP (cyclic prefix) from the converted digital signal. The radio reception unit 3057 performs fast Fourier transform (FFT) on the signal from which the CP is removed to extract a signal of the frequency region and outputs the extracted signal to the demultiplexing unit 3055.

The demultiplexing unit 3055 demultiplexes the signal input from the radio reception unit 3057 into signals such as the PUCCH, the PUSCH, and the uplink reference signal. The demultiplexing is decided by the radio resource control unit 3011 of the base station apparatus 3 in advance and is performed based on allocation information of the radio resource included in the uplink grant of which each terminal apparatus 1 is notified. The demultiplexing unit 3055 compensates for the channel of the PUCCH and the PUSCH from the estimated value of the channel input from the channel measurement unit 3059. The demultiplexing unit 3055 outputs the separated uplink reference signals to the channel measurement unit 3059.

The demodulation unit 3053 performs inverse discrete Fourier transform (IDFT) on the PUSCH, acquires the modulation symbols, and demodulates the received signal on each of the modulation symbols of the PUCCH and the PUSCH using a modulation scheme determined in advance, such as BPSK (binary phase shift keying), QPSK, 16 QAM, or 64 QAM, or a modulation scheme of which the base station apparatus notifies each terminal apparatus 1 in advance with the uplink grant. The demodulation unit 3053 separates the modulation symbols of the plurality of pieces of uplink data transmitted with the same PUSCH by using the MIMO SM, based on the number of spatially multiplexed series of which each terminal apparatus 1 is notified in advance with the uplink grant and information indicating the precoding performed on the series.

The decoding unit 3051 decodes the demodulated coded bits of the PUCCH and the PUSCH at the coding rate which is the coding rate of the coding scheme determined in advance and which is determined in advance or of which the base station apparatus notifies the terminal apparatus 1 in advance with the uplink grant, and then outputs the decoded uplink data and the uplink control information to the higher layer processing unit 301. When the PUSCH is retransmitted, the decoding unit 3051 performs the decoding using the coded bits input from the higher layer processing unit 301 and retained in an HARQ buffer and the demodulated coded bits. The channel measurement unit 309 measures an estimated value of the channel, the channel quality, and the like from the uplink reference signal input from the demultiplexing unit 3055 and outputs the estimated value, the channel quality, and the like to the demultiplexing unit 3055 and the higher layer processing unit 301.

The transmission unit 307 generates the downlink reference signal according to the control signal input from the control unit 303, codes and modulates the HARQ indicator, the downlink control information, and the downlink data input from the higher layer processing unit 301, multiplexes the PHICH, the PDCCH, the EPDCCH, the PDSCH, and the downlink reference signal, and transmits the multiplexed signals to the terminal apparatus 1 via the transmission/reception antenna 309.

The coding unit 3071 codes the HARQ indicator, the downlink control information, and the downlink data input from the higher layer processing unit 301 using a coding scheme determined in advance, such as block coding, convolutional coding, or turbo coding or codes the HARQ indicator, the downlink control information, and the downlink data using the coding scheme determined by the radio resource control unit 3011. The modulation unit 3073 modulates the coded bits input from the coding unit 3071 according to the modulation scheme determined in advance, such as the BPSK, the QPSK, the 16 QAM, or the 64 QAM, or the modulation scheme determined by the radio resource control unit 3011.

The downlink reference signal generation unit 3079 generates the series which are obtained according to a rule determined in advance based on the physical layer cell identifier (PCI) or the like for identifying the base station apparatus 3 and is known by the terminal apparatus 1, as the downlink reference signal. The multiplexing unit 3075 multiplexes the modulated modulation symbol of each channel and the generated downlink reference signal. That is, the multiplexing unit 3075 arranges the modulated modulation symbol of each channel and the generated downlink reference signal in the resource element.

The radio transmission unit 3077 performs inverse fast Fourier transform (IFFT) on the multiplexed modulation symbols, generates the OFDM symbols, adds the CP to the generated OFDM symbols, generates a baseband digital signal, converts the baseband digital signal into an analog signal, removes an excessive frequency component using a lowpass filter, performs upconverting on a carrier frequency, performs power amplification, and outputs the signal to the transmission/reception antenna 309 to transmit the signal.

More specifically, the terminal apparatus 1 according to the embodiment includes a configuration unit (the radio resource control unit 1011) that sets the UL reference UL-DL configuration, the DL reference UL-DL configuration, the parameter (twoIntervalsConfig) and stores the uplink grant received as the uplink grant of the configured semi-persistent scheduling from the base station apparatus.

The terminal apparatus 1 according to the embodiment includes the SPS control unit 1015 that sets the value of the subframe offset used to specify the SFN and the subframe in which the transmission on the physical uplink shared channel is performed, based on whether the parameter (twoIntervalsConfig) is set and whether the DL reference UL-DL configuration is set when the uplink grant of the semi-persistent scheduling is set.

Here, when the uplink grant of the semi-persistent scheduling is set, the SPS control unit 1015 may set the value of the subframe offset used to specify the SFN and the subframe in which the transmission on the physical uplink shared channel is performed, based on whether the parameter (twoIntervalsConfig) is set, whether the DL reference UL-DL configuration is set, and the value of the UL reference UL-DL configuration.

When the uplink grant of the semi-persistent scheduling is set and the parameter (twoIntervalsConfig) is not set, the SPS control unit 1015 may set 0 as the value of the subframe offset.

When the uplink grant of the semi-persistent scheduling is set, the parameter (twoIntervalsConfig) is set, and the DL reference UL-DL configuration is not set, the SPS control unit 1015 may set the value of the subframe offset based on the UL reference UL-DL configuration.

When the uplink grant of the semi-persistent scheduling is set, the parameter (twoIntervalsConfig) is set, and the DL reference UL-DL configuration is set, the SPS control unit 1015 may set the value of the subframe offset based on the DL reference UL-DL configuration.

When the uplink grant of the semi-persistent scheduling is set, the parameter (twoIntervalsConfig) is set, and the UL reference UL-DL configuration is set to a specific value, the SPS control unit 1015 may set the value of the subframe offset based on the UL reference UL-DL configuration.

When the uplink grant of the semi-persistent scheduling is set, the parameter (twoIntervalsConfig) is set, and the UL reference UL-DL configuration is set to a value other than the specific value, the SPS control unit 1015 may set the value of the subframe offset based on the DL reference UL-DL configuration.

The SPS control unit 1015 considers the uplink grant of the Nth semi-persistent scheduling to occur in the SFN and the subframe specified based on the value of the subframe offset.

The SPS control unit 1015 may consider the uplink grant of the Nth semi-persistent scheduling to occur in the subframe specified based on the subframe offset, the parameter (semiPersistSchedIntervalUL), and the SFN and the subframe at the time of the initialization or reinitialization of the semi-persistent scheduling.

The SPS control unit may specify the SFN and the subframe in which the uplink grant of the semi-persistent scheduling is initialized or reinitialized based on the UL reference UL-DL configuration and the SFN and the subframe in which the uplink grant is received.

The terminal apparatus 1 according to the embodiment includes the transmission unit 107 that performs transmission on the physical uplink shared channel in the specified subframe based on the uplink grant of the semi-persistent scheduling in the specific subframe.

The base station apparatus 3 according to the embodiment includes the configuration unit (the radio resource control unit 3011) that sets the UL reference UL-DL configuration, the DL reference UL-DL configuration, and the parameter (twoIntervalsConfig) and stores the uplink grant received as the uplink grant of the configured semi-persistent scheduling from the base station apparatus.

The base station apparatus 3 according to the embodiment includes the SPS control unit 3015 that sets the value of the subframe offset used to specify the SFN and the subframe in which the transmission is performed on the physical uplink shared channel based on whether the parameter (twoIntervalsConfig) is set and whether the DL reference UL-DL configuration is set, when the uplink grant of the semi-persistent scheduling is configured.

Here, when the uplink grant of the semi-persistent scheduling is set, the SPS control unit 3015 may set the value of the subframe offset used to specify the SFN and the subframe in which the transmission on the physical uplink shared channel is performed based on whether the parameter (twoIntervalsConfig) is set, whether the DL reference UL-DL configuration is set, and the value of the UL reference UL-DL configuration.

When the uplink grant of the semi-persistent scheduling is set and the parameter (twoIntervalsConfig) is not set, the SPS control unit 3015 may set 0 as the value of the subframe offset.

When the uplink grant of the semi-persistent scheduling is set, the parameter (twoIntervalsConfig) is set, and the DL reference UL-DL configuration is not set, the SPS control unit 3015 may set the value of the subframe offset based on the UL reference UL-DL configuration.

When the uplink grant of the semi-persistent scheduling is set, the parameter (twoIntervalsConfig) is set, and the DL reference UL-DL configuration is set, the SPS control unit 3015 may set the value of the subframe offset based on the DL reference UL-DL configuration.

When the uplink grant of the semi-persistent scheduling is set, the parameter (twoIntervalsConfig) is set, the UL reference UL-DL configuration is set to the specific value, the SPS control unit 3015 may set the value of the subframe offset based on the UL reference UL-DL configuration.

When the uplink grant of the semi-persistent scheduling is set, the parameter (twoIntervalsConfig) is set, and the UL reference UL-DL configuration is set to the value other than the specific value, the SPS control unit 3015 may set the value of the subframe offset based on the DL reference UL-DL configuration.

The SPS control unit 3015 considers the uplink grant of the Nth semi-persistent scheduling to occur in the SFN and the subframe specified based on the value of the subframe offset.

The SPS control unit 3015 may consider the uplink grant of the Nth semi-persistent scheduling to occur in the subframe specified based on the subframe offset, the parameter (semiPersistSchedIntervalUL), and the SFN and the subframe at the time of the initialization or reinitialization of the semi-persistent scheduling.

The SPS control unit 3015 may specify the SFN and the subframe in which the uplink grant of the semi-persistent scheduling is initialized or reinitialized based on the UL reference UL-DL configuration and the SFN and the subframe in which the uplink grant is received.

The base station apparatus 3 according to the embodiment includes the reception unit 305 that performs reception in the physical uplink shared channel based on the uplink grant of the semi-persistent scheduling in the specific subframe.

Here, another example of the method of transmitting the uplink data according to the embodiment will be described with reference to FIG. 17.

The base station apparatus 3 and the terminal apparatus 1 may exchangeably consider the UL-DL configuration in the table of FIG. 16 to be the DL reference UL-DL configuration or consider the UL-DL configuration to be the UL reference UL-DL configuration based on the position of the subframe (the position of the initial SPS UL grant) in which the initial transmission on the PUSCH corresponding to the 0th configured uplink grant is performed.

For example, when the initial transmission on the PUSCH corresponding to the 0th configured uplink grant is performed in a fixed uplink subframe, the base station apparatus 3 and the terminal apparatus 1 may consider the UL-DL configuration in the table of FIG. 16 to be the DL reference UL-DL configuration. That is, when the initial transmission on the PUSCH corresponding to the 0th configured uplink grant is performed in the subframe indicated as the uplink subframe based on the DL reference UL-DL configuration, the base station apparatus 3 and the terminal apparatus 1 may consider the UL-DL configuration in the table of FIG. 16 to be the DL reference UL-DL configuration.

That is, when the initial transmission on the PUSCH corresponding to the 0th configured uplink grant is scheduled in the fixed uplink subframe, the base station apparatus 3 may set the value of Subframe_Offset based on the DL reference UL-DL configuration and specify the subframe in which the transmission on the semi-persistent PUSCH is performed on the basis of Math. (1).

When the initial transmission on the PUSCH corresponding to the 0th configured uplink grant is scheduled in the fixed uplink subframe, the terminal apparatus 1 may set the value of Subframe_Offset based on the DL reference UL-DL configuration and specify the subframe in which the transmission on the semi-persistent PUSCH is performed on the basis of Math. (1).

That is, when the parameter (twoIntervalsConfig) is validated in accordance with the higher layer, the DL reference UL-DL configuration is set, and the initial transmission on the PUSCH corresponding to the 0th configured uplink grant is performed in the fixed uplink subframe, the base station apparatus 3 and the terminal apparatus 1 may set the value of Subframe_Offset based on the DL reference UL-DL configuration and specify the subframe in which the transmission on the semi-persistent PUSCH is performed on the basis of Math. (1).

When the initial transmission on the PUSCH corresponding to the 0th configured uplink grant is performed in the flexible subframe (the first flexible subframe and/or the second flexible subframe), the base station apparatus 3 and the terminal apparatus 1 may consider the UL-DL configuration in the table of FIG. 16 to be the UL reference UL-DL configuration. That is, when the initial transmission on the PUSCH corresponding to the 0th configured uplink grant is performed in the subframe indicated as the downlink subframe based on the DL reference UL-DL configuration, the base station apparatus 3 and the terminal apparatus 1 may consider the UL-DL configuration in the table of FIG. 16 to be the UL reference UL-DL configuration.

That is, when the initial transmission on the PUSCH corresponding to the 0th configured uplink grant is scheduled in the flexible subframe, the base station apparatus 3 may set the value of Subframe_Offset based on the UL reference UL-DL configuration and specify the subframe in which the transmission on the semi-persistent PUSCH is performed on the basis of Math. (1).

When the initial transmission on the PUSCH corresponding to the 0th configured uplink grant is scheduled in the flexible subframe, the terminal apparatus 1 may set the value of Subframe_Offset based on the UL reference UL-DL configuration and specify the subframe in which the transmission on the semi-persistent PUSCH is performed on the basis of Math. (1).

That is, when the parameter (twoIntervalsConfig) is validated in accordance with the higher layer, the DL reference UL-DL configuration is set, and the initial transmission on the PUSCH corresponding to the 0th configured uplink grant is performed in the flexible uplink subframe, the base station apparatus 3 and the terminal apparatus 1 may set the value of Subframe_Offset based on the UL reference UL-DL configuration and specify the subframe in which the transmission on the semi-persistent PUSCH is performed on the basis of Math. (1).

For example, when the position of the initial transmission (the position of the initial SPS UL grant) on the PUSCH corresponding to the 0th configured uplink grant is [SFN=1, subframe 2] in FIG. 17, the terminal apparatus 1 sets the value of Subframe_Offset based on the DL reference UL-DL configuration. That is, the terminal apparatus 1 sets 5 as the value of Subframe_Offset. Here, [SFN=1, subframe 2] is the fixed uplink subframe. That is, [SFN=1, subframe 3] is the subframe indicated as the uplink subframe based on the DL reference UL-DL configuration.

The terminal apparatus 1 performs the initial transmission on the PUSCH corresponding to the 1st configured uplink grant in [SFN=2, subframe 7] specified on the basis of Math. (1). Further, the terminal apparatus 1 performs the initial transmission on the PUSCH corresponding to the 2nd configured uplink grant in [SFN=3, subframe 2] specified on the basis of Math. (1). The terminal apparatus 1 performs the initial transmission on the PUSCH corresponding to the 3rd configured uplink grant in [SFN=4, subframe 7] specified on the basis of Math. (1).

Thereafter, in regard to the initial transmission on the PUSCH corresponding to the Nth configured uplink grant, the terminal apparatus 1 sets the value of Subframe_Offset based on the DL reference UL-DL configuration and specify the subframe in which the transmission on the PUSCH is performed on the basis of Math. (1).

For example, when the position of the initial transmission (the position of the initial SPS UL grant) on the PUSCH corresponding to the 0th configured uplink grant is [SFN=1, subframe 3] in FIG. 17, the terminal apparatus 1 sets the value of Subframe_Offset based on the UL reference UL-DL configuration. That is, the terminal apparatus 1 sets 1 as the value of Subframe_Offset. Here, [SFN=1, subframe 3] is the flexible subframe. That is, [SFN=1, subframe 3] is the subframe indicated as the downlink subframe based on the DL reference UL-DL configuration.

The terminal apparatus 1 performs the initial transmission on the PUSCH corresponding to the 1st configured uplink grant in [SFN=2, subframe 2] specified on the basis of Math. (1). Further, the terminal apparatus 1 performs the initial transmission on the PUSCH corresponding to the 2nd configured uplink grant in [SFN=3, subframe 3] specified on the basis of Math. (1). The terminal apparatus 1 performs the initial transmission on the PUSCH corresponding to the 3rd configured uplink grant in [SFN=4, subframe 2] specified on the basis of Math. (1).

Thereafter, in regard to the initial transmission on the PUSCH corresponding to the Nth configured uplink grant, the terminal apparatus 1 sets the value of Subframe_Offset based on the UL reference UL-DL configuration and specify the subframe in which the transmission on the PUSCH is performed on the basis of Math. (1).

That is, when the uplink grant of the semi-persistent scheduling is set, the SPS control unit 1015 of the terminal apparatus 1 illustrated in FIG. 19 may set the value of the subframe offset used to specify the SFN and the subframe in which the transmission on the physical uplink shared channel is performed, based on whether the parameter (twoIntervalsConfig) is set, whether the DL reference UL-DL configuration is set, and the subframe in which the initial transmission on the PUSCH corresponding to the 0th configured uplink grant is performed.

Further, when the uplink grant of the semi-persistent scheduling is set, the SPS control unit 3015 of the base station apparatus 3 illustrated in FIG. 20 may set the value of the subframe offset used to specify the SFN and the subframe in which the transmission on the physical uplink shared channel is performed, based on whether the parameter (twoIntervalsConfig) is set, whether the DL reference UL-DL configuration is set, and the subframe in which the initial transmission on the PUSCH corresponding to the 0th configured uplink grant is performed.

The base station apparatus 3 may perform control such that the position (the position of the initial SPS UL grant) of the initial transmission on the PUSCH corresponding to the 0th configured uplink grant is normally the fixed uplink subframe. That is, the base station apparatus 3 may perform scheduling so that the initial transmission on the PUSCH corresponding to the 0th configured uplink grant is normally performed in the fixed uplink subframe.

In this case, the terminal apparatus 1 may not expect that the position (the position of the initial SPS UL grant) of the initial transmission on the PUSCH corresponding to the 0th configured uplink grant is the flexible subframe. That is, the terminal apparatus 1 may not expect that the initial transmission on the PUSCH corresponding to the 0th configured uplink grant is scheduled in the flexible subframe.

For example, when the DCI format (for example, DCI format 0, the uplink grant) for an uplink indicating activation of the semi-persistent scheduling in the flexible subframe is detected, the terminal apparatus 1 may discard the DCI format for the uplink.

For example, the terminal apparatus 1 may not monitor and/or verify the DCI format for the uplink indicating activation of the semi-persistent scheduling in the flexible subframe. That is, the terminal apparatus 1 may not monitor and/or verify the DCI format for the uplink indicating the initial transmission on the PUSCH for the semi-persistent scheduling in the flexible subframe.

That is, the terminal apparatus 1 may not monitor and/or verify the DCI format for the uplink indicating activation of the transmission on the PUSCH (the transmission on the semi-persistent PUSCH) in the flexible subframe. That is, the terminal apparatus 1 may not monitor and/or verify the DCI format for the uplink indicating the initial transmission on the PUSCH in the flexible subframe.

Accordingly, it is possible to schedule the initial transmission on the PUSCH corresponding to the 0th configured uplink grant more flexibly. That is, the base station apparatus 3 can schedule the initial transmission on the PUSCH corresponding to the 0th configured uplink grant in either of the fixed uplink subframe and the flexible subframe, and thus perform the transmission on the PUSCH efficiently. Accordingly, the terminal apparatus 1 can perform the transmission of the uplink data efficiently.

As described above, the base station apparatus 3 and the terminal apparatus 1 may set the value of Subframe_Offset based on the DL reference UL-DL configuration and specify the subframe in which the transmission on the PUSCH is performed. The base station apparatus 3 and the terminal apparatus 1 may set the value of Subframe_Offset based on the UL reference UL-DL configuration and specify the subframe in which the transmission on the PUSCH is performed.

The base station apparatus 3 and the terminal apparatus 1 can match the initial transmission and the retransmission corresponding to the Nth configured uplink grant with the UL HARQ process of the same number by specifying the subframe in which the transmission on the PUSCH is performed in this way. The initial transmission on the PUSCH corresponding to the Nth configured uplink grant can occur only in the fixed uplink subframe.

The base station apparatus 3 and the terminal apparatus 1 can match all of the transmissions corresponding to the even-number configured uplink grants with the UL HARQ process of the same number by setting the value of Subframe_Offset based on the DL reference UL-DL configuration. The base station apparatus 3 and the terminal apparatus 1 can match all of the transmissions corresponding to the odd-number configured uplink grants with the UL HARQ process of the same number. The base station apparatus 3 and the terminal apparatus 1 can match the even-number configured uplink grant and the odd-number configured uplink grant with the UL HARQ processes of different numbers.

Accordingly, it is possible to avoid a situation in which the UL HARQ process number corresponding to an Nth configured uplink grant is the same as the UL HARQ process number corresponding to an (N+1)th configured uplink grant, and thus only one of the process corresponding to the Nth configured uplink grant and the process corresponding to the (N+1)th configured uplink grant can be performed in the corresponding UL HARQ number.

Accordingly, the terminal apparatus 1 can perform the transmission of the uplink data efficiently.

The present invention can also be described as follows.

(1) According to the invention, a terminal apparatus that communicates with a base station apparatus includes a configuration unit that sets a UL reference UL-DL configuration, a DL reference UL-DL configuration, and a parameter (twoIntervalsConfig) and stores an uplink grant received as an uplink grant of configured semi-persistent scheduling from the base station apparatus; and an SPS control unit that sets 0 as the value of the subframe offset when the uplink grant of the semi-persistent scheduling is set and the parameter (twoIntervalsConfig) is not set, sets the value of the subframe offset based on the UL reference UL-DL configuration when the uplink grant of the semi-persistent scheduling is set, the parameter (twoIntervalsConfig) is set, and the DL reference UL-DL configuration is not set, sets the value of the subframe offset based on the DL reference UL-DL configuration when the uplink grant of the semi-persistent scheduling is set, the parameter (twoIntervalsConfig) is set, and the DL reference UL-DL configuration is set, and considers the uplink grant of Nth semi-persistent scheduling to occur in the SFN and the subframe specified based on the value of the subframe offset.

(2) A terminal apparatus that communicates with a base station apparatus includes a configuration unit that sets a UL reference UL-DL configuration, a DL reference UL-DL configuration, and a parameter (twoIntervalsConfig) and stores an uplink grant received as an uplink grant of configured semi-persistent scheduling from the base station apparatus; and an SPS control unit that sets 0 as the value of the subframe offset when the uplink grant of the semi-persistent scheduling is set and the parameter (twoIntervalsConfig) is not set, sets the value of the subframe offset based on the UL reference UL-DL configuration when the uplink grant of the semi-persistent scheduling is set, the parameter (twoIntervalsConfig) is set, and the DL reference UL-DL configuration is set to the specific value, sets the value of the subframe offset based on the DL reference UL-DL configuration when the uplink grant of the semi-persistent scheduling is set, the parameter (twoIntervalsConfig) is set, the UL reference UL-DL configuration is set to the value other than the specific value, and considers the uplink grant of Nth semi-persistent scheduling to occur in the SFN and the subframe specified based on the value of the subframe offset.

(3) According to the invention, a base station apparatus that communicates with a terminal apparatus includes a configuration unit that sets a UL reference UL-DL configuration, a DL reference UL-DL configuration, and a parameter (twoIntervalsConfig) and stores an uplink grant transmitted as an uplink grant of configured semi-persistent scheduling to the terminal apparatus; and an SPS control unit that sets 0 as the value of the subframe offset when the uplink grant of the semi-persistent scheduling is set and the parameter (twoIntervalsConfig) is not set, sets the value of the subframe offset based on the UL reference UL-DL configuration when the uplink grant of the semi-persistent scheduling is set, the parameter (twoIntervalsConfig) is set, and the DL reference UL-DL configuration is not set, sets the value of the subframe offset based on the DL reference UL-DL configuration when the uplink grant of the semi-persistent scheduling is set, the parameter (twoIntervalsConfig) is set, and the DL reference UL-DL configuration is set, and considers the uplink grant of Nth semi-persistent scheduling to occur in the SFN and the subframe specified based on the value of the subframe offset.

(4) A base station apparatus that communicates with a terminal apparatus includes a configuration unit that sets a UL reference UL-DL configuration, a DL reference UL-DL configuration, and a parameter (twoIntervalsConfig) and stores an uplink grant transmitted as an uplink grant of configured semi-persistent scheduling to the terminal apparatus; and an SPS control unit that sets 0 as the value of the subframe offset when the uplink grant of the semi-persistent scheduling is set and the parameter (twoIntervalsConfig) is not set, sets the value of the subframe offset based on the UL reference UL-DL configuration when the uplink grant of the semi-persistent scheduling is set, the parameter (twoIntervalsConfig) is set, and the UL reference UL-DL configuration is set to the specific value, sets the value of the subframe offset based on the DL reference UL-DL configuration when the uplink grant of the semi-persistent scheduling is set, the parameter (twoIntervalsConfig) is set, the UL reference UL-DL configuration is set to the value other than the specific value, and considers the uplink grant of Nth semi-persistent scheduling to occur in the SFN and the subframe specified based on the value of the subframe offset.

(5) According to the invention, an integrated circuit mounted on a terminal apparatus communicating with a base station apparatus causes the terminal apparatus to have a function of setting a UL reference UL-DL configuration, a DL reference UL-DL configuration, and a parameter (twoIntervalsConfig) and storing an uplink grant received as an uplink grant of configured semi-persistent scheduling from the base station apparatus; and a function of setting 0 as the value of the subframe offset when the uplink grant of the semi-persistent scheduling is set and the parameter (twoIntervalsConfig) is not set, setting the value of the subframe offset based on the UL reference UL-DL configuration when the uplink grant of the semi-persistent scheduling is set, the parameter (twoIntervalsConfig) is set, and the DL reference UL-DL configuration is not set, setting the value of the subframe offset based on the DL reference UL-DL configuration when the uplink grant of the semi-persistent scheduling is set, the parameter (twoIntervalsConfig) is set, and the DL reference UL-DL configuration is set, and considering the uplink grant of Nth semi-persistent scheduling to occur in the SFN and the subframe specified based on the value of the subframe offset.

(6) According to the invention, an integrated circuit mounted on a terminal apparatus communicating with a base station apparatus causes the terminal apparatus to have a function of setting a UL reference UL-DL configuration, a DL reference UL-DL configuration, and a parameter (twoIntervalsConfig) and storing an uplink grant received as an uplink grant of configured semi-persistent scheduling from the base station apparatus; and a function of setting 0 as the value of the subframe offset when the uplink grant of the semi-persistent scheduling is set and the parameter (twoIntervalsConfig) is not set, setting the value of the subframe offset based on the UL reference UL-DL configuration when the uplink grant of the semi-persistent scheduling is set, the parameter (twoIntervalsConfig) is set, and the DL reference UL-DL configuration is set to the specific value, sets the value of the subframe offset based on the DL reference UL-DL configuration when the uplink grant of the semi-persistent scheduling is set, the parameter (twoIntervalsConfig) is set, the UL reference UL-DL configuration is set to the value other than the specific value, and considering the uplink grant of Nth semi-persistent scheduling to occur in the SFN and the subframe specified based on the value of the subframe offset.

(7) An integrated circuit mounted on a base station apparatus communicating with a terminal apparatus causes the base station apparatus to have a function of setting a UL reference UL-DL configuration, a DL reference UL-DL configuration, and a parameter (twoIntervalsConfig) and storing an uplink grant transmitted as an uplink grant of configured semi-persistent scheduling to the terminal apparatus; and a function of setting 0 as the value of the subframe offset when the uplink grant of the semi-persistent scheduling is set and the parameter (twoIntervalsConfig) is not set, setting the value of the subframe offset based on the UL reference UL-DL configuration when the uplink grant of the semi-persistent scheduling is set, the parameter (twoIntervalsConfig) is set, and the DL reference UL-DL configuration is not set, setting the value of the subframe offset based on the DL reference UL-DL configuration when the uplink grant of the semi-persistent scheduling is set, the parameter (twoIntervalsConfig) is set, and the DL reference UL-DL configuration is set, and considering the uplink grant of Nth semi-persistent scheduling to occur in the SFN and the subframe specified based on the value of the subframe offset.

(8) An integrated circuit mounted on a base station apparatus communicating with a terminal apparatus causes the base station apparatus to have a function of setting a UL reference UL-DL configuration, a DL reference UL-DL configuration, and a parameter (twoIntervalsConfig) and storing an uplink grant transmitted as an uplink grant of configured semi-persistent scheduling to the terminal apparatus; and a function of setting 0 as the value of the subframe offset when the uplink grant of the semi-persistent scheduling is set and the parameter (twoIntervalsConfig) is not set, setting the value of the subframe offset based on the UL reference UL-DL configuration when the uplink grant of the semi-persistent scheduling is set, the parameter (twoIntervalsConfig) is set, and the UL reference UL-DL configuration is set to the specific value, setting the value of the subframe offset based on the DL reference UL-DL configuration when the uplink grant of the semi-persistent scheduling is set, the parameter (twoIntervalsConfig) is set, the UL reference UL-DL configuration is set to the value other than the specific value, and considering the uplink grant of Nth semi-persistent scheduling to occur in the SFN and the subframe specified based on the value of the subframe offset.

(9) According to the invention, a communication method of a terminal apparatus communicating with a base station apparatus includes: setting a UL reference UL-DL configuration, a DL reference UL-DL configuration and a parameter (twoIntervalsConfig) and storing an uplink grant received as an uplink grant of configured semi-persistent scheduling from the base station apparatus; and setting 0 as the value of the subframe offset when the uplink grant of the semi-persistent scheduling is set and the parameter (twoIntervalsConfig) is not set, setting the value of the subframe offset based on the UL reference UL-DL configuration when the uplink grant of the semi-persistent scheduling is set, the parameter (twoIntervalsConfig) is set, and the DL reference UL-DL configuration is not set, setting the value of the subframe offset based on the DL reference UL-DL configuration when the uplink grant of the semi-persistent scheduling is set, the parameter (twoIntervalsConfig) is set, and the DL reference UL-DL configuration is set, and considering the uplink grant of Nth semi-persistent scheduling to occur in the SFN and the subframe specified based on the value of the subframe offset.

(10) According to the invention, a communication method of a terminal apparatus communicating with a base station apparatus includes: setting a UL reference UL-DL configuration, a DL reference UL-DL configuration and a parameter (twoIntervalsConfig) and storing an uplink grant received as an uplink grant of configured semi-persistent scheduling from the base station apparatus; and a function of setting 0 as the value of the subframe offset when the uplink grant of the semi-persistent scheduling is set and the parameter (twoIntervalsConfig) is not set, setting the value of the subframe offset based on the UL reference UL-DL configuration when the uplink grant of the semi-persistent scheduling is set, the parameter (twoIntervalsConfig) is set, and the UL reference UL-DL configuration is set to the specific value, sets the value of the subframe offset based on the DL reference UL-DL configuration when the uplink grant of the semi-persistent scheduling is set, the parameter (twoIntervalsConfig) is set, the UL reference UL-DL configuration is set to the value other than the specific value, and considering the uplink grant of Nth semi-persistent scheduling to occur in the SFN and the subframe specified based on the value of the subframe offset.

(11) A communication method of a base station apparatus communicating with a terminal apparatus includes: setting a UL reference UL-DL configuration, a DL reference UL-DL configuration and a parameter (twoIntervalsConfig) and storing an uplink grant transmitted as an uplink grant of configured semi-persistent scheduling to the terminal apparatus; and setting 0 as the value of the subframe offset when the uplink grant of the semi-persistent scheduling is set and the parameter (twoIntervalsConfig) is not set, setting the value of the subframe offset based on the UL reference UL-DL configuration when the uplink grant of the semi-persistent scheduling is set, the parameter (twoIntervalsConfig) is set, and the DL reference UL-DL configuration is not set, setting the value of the subframe offset based on the DL reference UL-DL configuration when the uplink grant of the semi-persistent scheduling is set, the parameter (twoIntervalsConfig) is set, and the DL reference UL-DL configuration is set, and considering the uplink grant of Nth semi-persistent scheduling to occur in the SFN and the subframe specified based on the value of the subframe offset.

(12) A communication method of a base station apparatus communicating with a terminal apparatus includes: setting a UL reference UL-DL configuration, a DL reference UL-DL configuration and a parameter (twoIntervalsConfig) and storing an uplink grant transmitted as an uplink grant of configured semi-persistent scheduling to the terminal apparatus; and setting 0 as the value of the subframe offset when the uplink grant of the semi-persistent scheduling is set and the parameter (twoIntervalsConfig) is not set, setting the value of the subframe offset based on the UL reference UL-DL configuration when the uplink grant of the semi-persistent scheduling is set, the parameter (twoIntervalsConfig) is set, and the UL reference UL-DL configuration is set to the specific value, setting the value of the subframe offset based on the DL reference UL-DL configuration when the uplink grant of the semi-persistent scheduling is set, the parameter (twoIntervalsConfig) is set, the UL reference UL-DL configuration is set to the value other than the specific value, and considering the uplink grant of Nth semi-persistent scheduling to occur in the SFN and the subframe specified based on the value of the subframe offset.

A program operating in the base station apparatus 3 and the terminal apparatus 1 according to the present invention may be a program (a program enabling a computer to function) controlling a CPU (central processing unit) or the like so that the functions of the foregoing embodiments of the present invention are realized. Information handled in these apparatuses is temporarily stored in a RAM (random access memory) at the time of processing of the information. Thereafter, the information is stored in any of various ROMs (read-only memories) such as a flash ROM or an HDD (hard disk drive), is read by the CPU, as necessary, and is corrected and written.

Parts of the terminal apparatus 1 and the base station apparatus 3 according to the above-described embodiments may be realized in a computer. In this case, a program for realizing the control functions may be recorded in a computer-readable recording medium and the program recorded in the recording medium may be read by a computer system to be executed so that the control functions are realized.

The "computer system" mentioned herein refers to a computer system included in the terminal apparatus 1 or the base station apparatus 3 and is assumed to include an OS or hardware such as a peripheral device. The "computer-readable recording medium" refers to a portable medium such as a flexible disk, a magneto-optical disc, a ROM, or a CD-ROM or a storage device such as a hard disk included in the computer system.

Further, the "computer-readable recording medium" may include a communication line that dynamically retains a program in a short time when a program is transmitted via the communication circuit, such as a network such as the Internet or a telephone line and a memory that retains a program for a given time, such as a volatile memory in a computer system serving as a server or a client in that case. The program may be a program that realizes some of the above-described functions or may be a program which further realizes the above-described functions in combination with a program already recorded in the computer system.

The base station apparatus 3 according to the above-described embodiment may be realized as a collective (apparatus group) including a plurality of apparatuses. Each of the apparatuses included in the apparatus group may have each function or some or all of the functional blocks of the base station apparatus 3 according to the above-described embodiment. The apparatus group may have each function or each normal functional block of the base station apparatus 3. The terminal apparatus 1 according to the above-described embodiment may also communicate with the base station apparatus serving as the collective.

The base station apparatus 3 according to the above-described embodiment may be a EUTRAN (evolved universal terrestrial radio access network). The base station apparatus 3 according to the above-described embodiment may have some or all of the functions of a higher node with respect to an eNodeB.

Parts or the entireties of the terminal apparatus 1 and the base station apparatus 3 according to the above-described embodiment may be generally realized as an LSI which is an integrated circuit or may be realized as a chip set. The functional blocks of the terminal apparatus 1 and the base station apparatus 3 may be individually chipped or some or all of the functional blocks may be integrated and chipped. A method of forming an integrated circuit is not limited to an LSI, but a dedicated circuit or a general processor may be realized. When a technology for making integrated circuits in place of the LSI appears with advance in semiconductor technologies, an integrated circuit by this technology can also be used.

In the above-described embodiment, the terminal apparatus has been described as an example of a communication apparatus, but the present invention is not limited thereto. The invention can also be applied to terminal apparatuses or communication apparatuses such as stationary or non-movable type electronic apparatuses installed indoors and outdoors, e.g., AV apparatuses, kitchen apparatuses, cleaning and washing apparatuses, air conditioning apparatuses, office apparatuses, vending machines, and other living apparatuses.

The embodiments of the present invention have been described in detail with reference to the drawings, but specific configurations are not limited to the embodiments. Modifications of design within the scope of the present invention without departing from the gist of the present invention are also included. The present invention can be modified in various ways within the scope described in the claims and embodiments obtained by appropriately combining technical means disclosed in other embodiments are also included in the technical scope of the present invention. The elements described in the embodiments and obtaining the same advantageous effects are substituted are also included.

DESCRIPTION OF REFERENCE NUMERALS 1 (1A, 1B, 1C) TERMINAL APPARATUS
3 BASE STATION APPARATUS
101 HIGHER LAYER PROCESSING UNIT
103 CONTROL UNIT
105 RECEPTION UNIT
107 TRANSMISSION UNIT
301 HIGHER LAYER PROCESSING UNIT
303 CONTROL UNIT
305 RECEPTION UNIT
307 TRANSMISSION UNIT
1011 RADIO RESOURCE CONTROL UNIT
1013 SCHEDULING INFORMATION INTERPRETATION UNIT
1015 SPS CONTROL UNIT
3011 RADIO RESOURCE CONTROL UNIT
3013 SCHEDULING UNIT
3015 SPS CONTROL UNIT

The invention claimed is:

1. A terminal apparatus configured to communicate with a base station apparatus, the terminal apparatus comprising:
receiving circuitry that:
receives a system information block type 1 message including first information indicating a first uplink-downlink configuration,
receives a radio resource control (RRC) message specific to the terminal apparatus, the RRC message including second information indicating a second uplink-downlink configuration,
receives, in a common search space of a physical downlink control channel, third information indicating a third uplink-downlink configuration, and
monitors, in a terminal apparatus-specific search space of the physical downlink control channel and the common search space of the physical down link control channel, an uplink grant including fourth information used for indicating an activation of a semi persistent scheduling, the uplink grant being monitored in a subframe indicated as a downlink subframe by the third information; and
transmitting circuitry that performs, based on the uplink grant, a transmission on a physical uplink shared channel in a subframe that is indicated as an uplink subframe by the third information, in a case that the third information is detected, wherein
in a case that two-intervals-Semi-Persistent Scheduling for the transmission on the physical uplink shared channel is enabled, a subframe offset value is set based on a combination of i) the first uplink-downlink configuration included in the system information block type 1 and ii) a position of an initial semi-persistent grant,
in a case that the two-intervals-Semi-Persistent Scheduling for the transmission on the physical uplink shared channel is disabled, the subframe offset value is set to 0, and
the uplink grant is considered by the terminal apparatus to occur in a subframe that is specified based on at least the subframe offset value.

2. A base station apparatus that-is-configured to communicate with a terminal apparatus, the base station apparatus comprising:
transmitting circuitry that:
transmits using a system information block type 1 message including first information indicating a first uplink-downlink configuration,
transmits a radio resource control (RRC) message specific to the terminal apparatus, the RRC message including second information indicating a second uplink-downlink configuration,
transmits, in a common search space of a physical downlink control channel, third information indicating a third uplink-downlink configuration, and
transmits, in a terminal apparatus-specific search space of the physical downlink control channel and the common search space of the physical down link control channel, an uplink grant including fourth information used for indicating an activation of a semi persistent scheduling, the uplink grant being monitored in a subframe indicated as a downlink subframe by the third information; and
receiving circuitry that performs, based on the uplink grant, a reception on a physical uplink shared channel in a subframe that is indicated as an uplink subframe by the third information, in a case that the third information is transmitted, wherein
in a case that two-intervals-Semi-Persistent Scheduling for the transmission on the physical uplink shared channel is enabled, a subframe offset value is set based on a combination of i) the first uplink-downlink configuration included in the system information block type 1 and ii) a position of an initial semi-persistent grant,
in a case that the two-intervals-Semi-Persistent Scheduling for the transmission on the physical uplink shared channel is disabled, the subframe offset value is set to 0, and
the uplink grant is considered to occur in a subframe that is specified based on at least the subframe offset value.

3. A communication method of a terminal apparatus configured to communicate with a base station apparatus, the communication method comprising:
receiving a system information block type 1 message including first information indicating a first uplink-downlink configuration,
receiving a radio resource control (RRC) message specific to the terminal apparatus, the RRC message including second information indicating a second uplink-downlink configuration,
receiving, in a common search space of a physical downlink control channel, third information indicating a third uplink-downlink configuration, monitoring, in a terminal apparatus-specific search space of the physical downlink control channel and the common search space of the physical down link control channel, an uplink grant including fourth information used for indicating an activation of a semi persistent scheduling, the uplink grant being monitored in a subframe indicated as a downlink subframe by the third information, and performing, based on the uplink grant, a transmission on a physical uplink shared channel in a subframe that is indicated as an uplink subframe by the third information, in a case that the third information is detected, wherein in a case that two-intervals-Semi-Persistent Scheduling for the transmission on the physical uplink shared channel is enabled, a subframe offset value is set based on a combination of i) the first uplink-downlink configuration included in the system information block type 1 and ii) a position of an initial semi-persistent grant, in a case that the two-intervals-Semi-Persistent Scheduling for the transmission on the physical uplink shared channel is disabled, the subframe offset value is set to 0, and the uplink grant is considered by the terminal apparatus to occur in a subframe that is specified based on at least the subframe offset value.

4. A communication method of a base station apparatus configured to communicate with a terminal apparatus, the communication method comprising:

transmitting a system information block type 1 message including first information indicating a first uplink-downlink configuration, transmitting a radio resource control (RRC) message specific to the terminal apparatus, the RRC message including second information indicating a second uplink-downlink configuration, transmitting, in a common search space of a physical downlink control channel third information indicating a third uplink-downlink configuration; and transmitting, in a terminal apparatus-specific search space of the physical downlink control channel and the common search space of the physical down link control channel, an uplink grant including fourth information used for indicating an activation of a semi persistent scheduling, the uplink grant being monitored in a subframe indicated as a downlink subframe by the third information, and performing, based on the uplink grant, a reception on a physical uplink shared channel in a subframe that is indicated as an uplink subframe by the third information, in a case that the third information is transmitted, wherein in a case that two-intervals-Semi-Persistent Scheduling for the transmission on the physical uplink shared channel is enabled, a subframe offset value is set based on a combination of i) the first uplink-downlink configuration included in the system information block type 1 and ii) a position of an initial semi-persistent grant, in a case that the two-intervals-Semi-Persistent Scheduling for the transmission on the physical uplink shared channel is disabled, the subframe offset value is set to 0, and the uplink grant is considered to occur in a subframe that is specified based on at least the subframe offset value.

* * * * *

UNITED STATES PATENT AND TRADEMARK OFFICE
CERTIFICATE OF CORRECTION

PATENT NO. : 10,470,208 B2  
APPLICATION NO. : 14/912678  
DATED : November 5, 2019  
INVENTOR(S) : Tatsushi Aiba et al.

Page 1 of 1

It is certified that error appears in the above-identified patent and that said Letters Patent is hereby corrected as shown below:

In the Claims

In Claim 2 in Column 50, Line 15 should be corrected as follows:
--A base station apparatus configured to commu- --

In Claim 2 in Column 50, Line 19 should be corrected as follows:
--transmits a system information block type 1--

In Claim 2 in Column 50, Line 43 should be corrected as follows:
--for the reception on the physical uplink shared--

In Claim 2 in Column 50, Line 50 should be corrected as follows:
--ing for the reception on the physical uplink shared--

In Claim 4 in Column 52, Line 21 should be corrected as follows:
--for the reception on the physical uplink shared--

In Claim 4 in Column 52, Line 28 should be corrected as follows:
--ing for the reception on the physical uplink shared--

Signed and Sealed this  
Fourth Day of February, 2020

Andrei Iancu  
*Director of the United States Patent and Trademark Office*